US011878523B2

(12) United States Patent
Miyagishi et al.

(10) Patent No.: US 11,878,523 B2
(45) Date of Patent: Jan. 23, 2024

(54) LIQUID EJECTING HEAD AND LIQUID EJECTING APPARATUS

(71) Applicant: Seiko Epson Corporation, Tokyo (JP)

(72) Inventors: Akira Miyagishi, Shiojiri (JP); Toshiro Murayama, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/658,316

(22) Filed: Apr. 7, 2022

(65) Prior Publication Data

US 2022/0324229 A1 Oct. 13, 2022

(30) Foreign Application Priority Data

Apr. 8, 2021 (JP) ................................ 2021-065692

(51) Int. Cl.
*B41J 2/14* (2006.01)

(52) U.S. Cl.
CPC ................................ *B41J 2/14201* (2013.01)

(58) Field of Classification Search
CPC .......... B41J 2/14201; B41J 2002/14338; B41J 2002/14419; B41J 2002/14475; B41J 2202/12; B41J 2/14233; B41J 2002/14362; B41J 2202/11
See application file for complete search history.

(56) References Cited

U.S. PATENT DOCUMENTS

2017/0259563 A1* 9/2017 Ozawa .................. B41J 2/1433
2020/0307212 A1 10/2020 Takabe et al.
2021/0001630 A1 1/2021 Taniuchi et al.

FOREIGN PATENT DOCUMENTS

JP 2021-011032 2/2021

* cited by examiner

*Primary Examiner* — Lisa Solomon
(74) *Attorney, Agent, or Firm* — WORKMAN NYDEGGER

(57) ABSTRACT

A liquid ejecting head includes a flow passage, an energy producing element, and a nozzle. A direction in which a portion which is a part of the flow passage and with which the nozzle is in communication extends is defined as a first direction. A direction in which the liquid is ejected from the nozzle and which is orthogonal to the first direction is defined as a second direction. A direction which is orthogonal to both the first direction and the second direction is defined as a third direction. Given this definition, the nozzle includes a first portion and a second portion, the second portion being located closer to the flow passage along the second direction than the first portion is. The cross-sectional area size of the first portion when viewed in the second direction is smaller than the cross-sectional area size of the second portion when viewed in the second direction. The width, in the third direction, of an overlapping portion that is a part of the second portion and is included in a first region is greater than the width, in the third direction, of a non-overlapping portion that is a part of the second portion and is included in a second region. The first region is a region where the second portion overlaps with the first portion in the first direction. The second region is a region where the second portion does not overlap with the first portion in the first direction.

20 Claims, 16 Drawing Sheets

LIQUID EJECTING HEAD AND LIQUID EJECTING APPARATUS

The present application is based on, and claims priority from JP Application Serial Number 2021-065692, filed Apr. 8, 2021, the disclosure of which is hereby incorporated by reference herein in its entirety.

BACKGROUND

1. Technical Field

Embodiments of the present disclosure relate to a liquid ejecting head and a liquid ejecting apparatus.

2. Related Art

In related art, liquid ejecting heads configured to eject liquid such as ink from nozzles are used. For example, JP-A-2021-011032 discloses a nozzle that includes a first portion and a second portion, wherein the second portion is located closer to a flow passage through which liquid flows, than the first portion is. The second portion of the nozzle disclosed in this publication has a horizontally elongated shape that is long in the direction in which the flow passage extends.

However, in a liquid ejecting head of related art such as one described above, there is a risk that the collapsing of a meniscus might occur due to the collision, with the meniscus, of a stream that goes into the second portion from the flow passage through which liquid flows, when the meniscus is pulled into the second portion. If the collapsing of the meniscus occurs, ejection stability might be impaired due to the forming of an air bubble in the liquid.

SUMMARY

A liquid ejecting head according to a certain aspect of the present disclosure includes a flow passage through which a liquid flows; an energy producing element that produces energy for ejecting the liquid; and a nozzle which is in communication with the flow passage and from which the liquid is ejected by utilizing the energy produced by the energy producing element; wherein a direction in which a portion which is a part of the flow passage and with which the nozzle is in communication extends is defined as a first direction, a direction in which the liquid is ejected from the nozzle and which is orthogonal to the first direction is defined as a second direction, and a direction which is orthogonal to both the first direction and the second direction is defined as a third direction, given above definition, the nozzle includes a first portion and a second portion, the second portion being located closer to the flow passage along the second direction than the first portion is, cross-sectional area size of the first portion when viewed in the second direction is smaller than cross-sectional area size of the second portion when viewed in the second direction, a width, in the third direction, of an overlapping portion that is a part of the second portion and is included in a first region is greater than a width, in the third direction, of a non-overlapping portion that is a part of the second portion and is included in a second region, the first region is a region where the second portion overlaps with the first portion in the first direction, and the second region is a region where the second portion does not overlap with the first portion in the first direction.

A liquid ejecting apparatus according to a certain aspect of the present disclosure includes the liquid ejecting head described above; and a control unit that controls operation of ejection from the liquid ejecting head described above.

DESCRIPTION OF EXEMPLARY EMBODIMENTS

Figure 1:
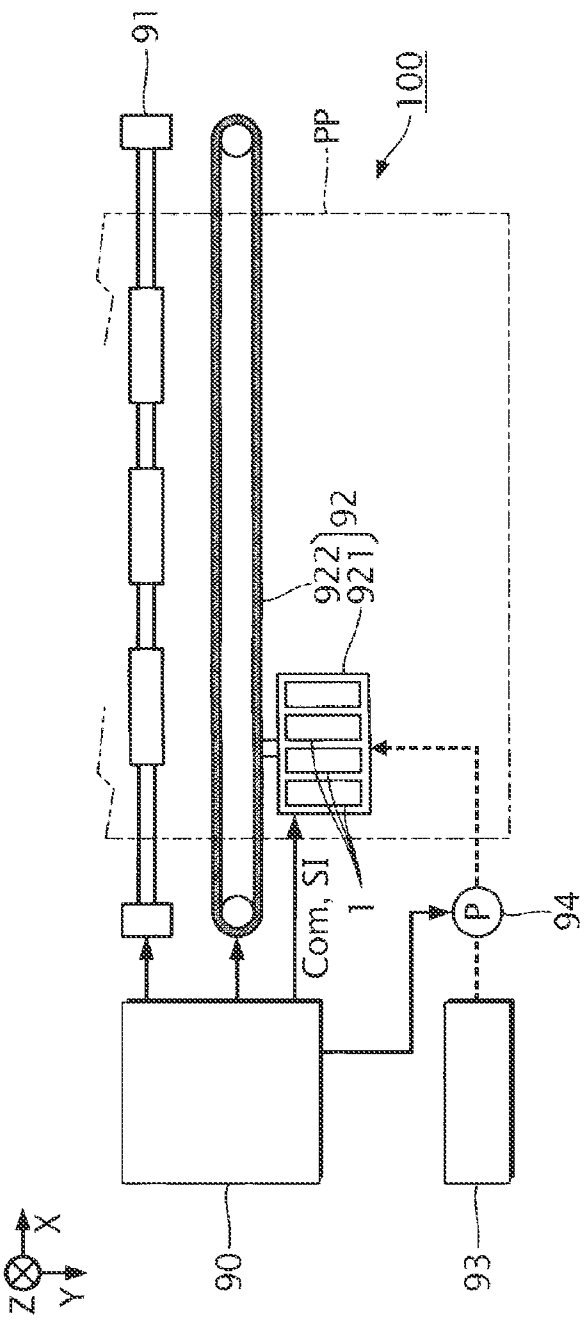
FIG. 1 is a schematic view of an example of a liquid ejecting apparatus according to a first embodiment.

With reference to the accompanying drawings, some exemplary embodiments of the present disclosure will now be explained. In the drawings, the dimensions and scales of components may be made different from those in actual implementation. Since the embodiments described below show some preferred examples of the present disclosure, they contain various technically-preferred limitations. However, the scope of the present disclosure shall not be construed to be limited to the examples described below unless and except where any intention of restriction is mentioned explicitly.

1. First Embodiment

FIG. 1 is a schematic view of an example of a liquid ejecting apparatus 100 according to a first embodiment. The liquid ejecting apparatus 100 according to the present embodiment is an ink-jet printing apparatus that ejects ink onto a medium PP. A typical example of the medium PP is printing paper, but not limited thereto. Any other type of a target of printing such as a resin film or a cloth may be used as the medium PP.

As illustrated in FIG. 1, the liquid ejecting apparatus 100 includes a liquid container(s) 93 containing ink. For example, a cartridge that can be detachably attached to the liquid ejecting apparatus 100, a bag-shaped ink pack made of a flexible film, an ink tank that can be refilled with ink, etc. may be used as the liquid container 93. Several types of ink different in color from one another are contained in the liquid containers 93.

As illustrated in FIG. 1, the liquid ejecting apparatus 100 includes a control unit 90, a moving mechanism 91, a carriage mechanism 92, and a circulation mechanism 94.

Among them, the control unit 90 includes, for example, a processing circuit such as a CPU or an FPGA, and a storage circuit such as a semiconductor memory, and controls various components of the liquid ejecting apparatus 100. CPU is an acronym for Central Processing Unit. FPGA is an acronym for Field Programmable Gate Array.

Under the control of the control unit 90, the moving mechanism 91 transports the medium PP in the +Y direction. In the description below, the +Y direction and the −Y direction, which is the opposite of the +Y direction, may be collectively referred to as "Y-axis direction".

Under the control of the control unit 90, the carriage mechanism 92 reciprocates a plurality of liquid ejecting heads 1 in the +X direction and the −X direction, which is the opposite of the +X direction. In the description below, the +X direction and the −X direction may be collectively referred to as "X-axis direction". The +X direction is a direction intersecting with the +Y direction. Typically, the +X direction is a direction orthogonal to the +Y direction. The carriage mechanism 92 includes a housing case 921, in which the plurality of liquid ejecting heads 1 is housed, and an endless belt 922, to which the housing case 921 is fixed. The liquid container 93 may be housed together with the liquid ejecting heads 1 in the housing case 921.

Under the control of the control unit 90, the circulation mechanism 94 supplies ink contained in the liquid container 93 to a supply flow passage RB1 provided in the liquid ejecting head 1. Moreover, under the control of the control unit 90, the circulation mechanism 94 collects ink from a discharge flow passage RB2 provided in the liquid ejecting head 1, and causes the collected ink to flow back to the supply flow passage RB1. The supply flow passage RB1 and the discharge flow passage RB2 will be described later with reference to FIG. 3.

As illustrated in FIG. 1, a drive signal Com for driving the liquid ejecting head 1 and a control signal SI for controlling the liquid ejecting head 1 are supplied from the control unit 90 to the liquid ejecting head 1. The liquid ejecting head 1 is controlled by means of the control signal SI and is driven by the drive signal Com under the control; ink supplied to the supply flow passage RB1 is supplied to each nozzle flow passage RN provided in the liquid ejecting head 1, and then the ink is ejected in the +Z direction from a part or all of a plurality of nozzles N provided in the liquid ejecting head 1, wherein the number of the nozzles N is denoted as M, where M is a natural number that is equal to or greater than one.

The +Z direction is a direction orthogonal to the +X direction and the +Y direction. In the description below, the +Z direction and the −Z direction, which is the opposite of the +Z direction, may be collectively referred to as "Z-axis direction". The nozzles N will be described later with reference to FIGS. 2 and 3. The nozzle flow passage RN will be described later with reference to FIG. 3.

Linked with the transportation of the medium PP by the moving mechanism 91 and the reciprocation of the liquid ejecting head 1 by the carriage mechanism 92, the liquid ejecting head 1 ejects ink droplets from a part or all of the plurality M of nozzles N such that the ejected ink droplets will land onto the surface of the medium PP, thereby forming a print-demanded image on the surface of the medium PP.

1.1. Overview of Liquid Ejecting Head

Figure 2:
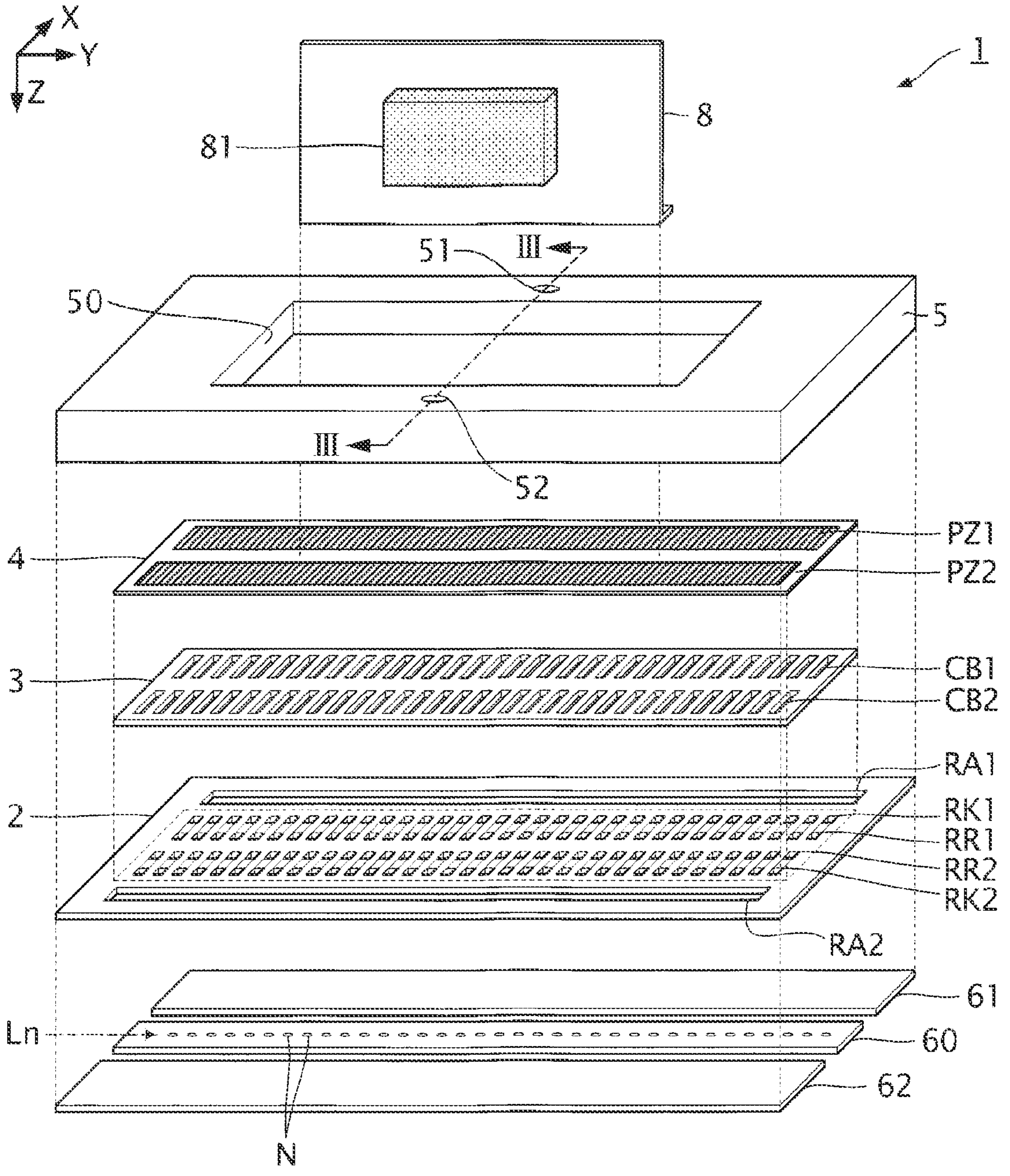
FIG. 2 is an exploded perspective view of a liquid ejecting head.
Figure 3:
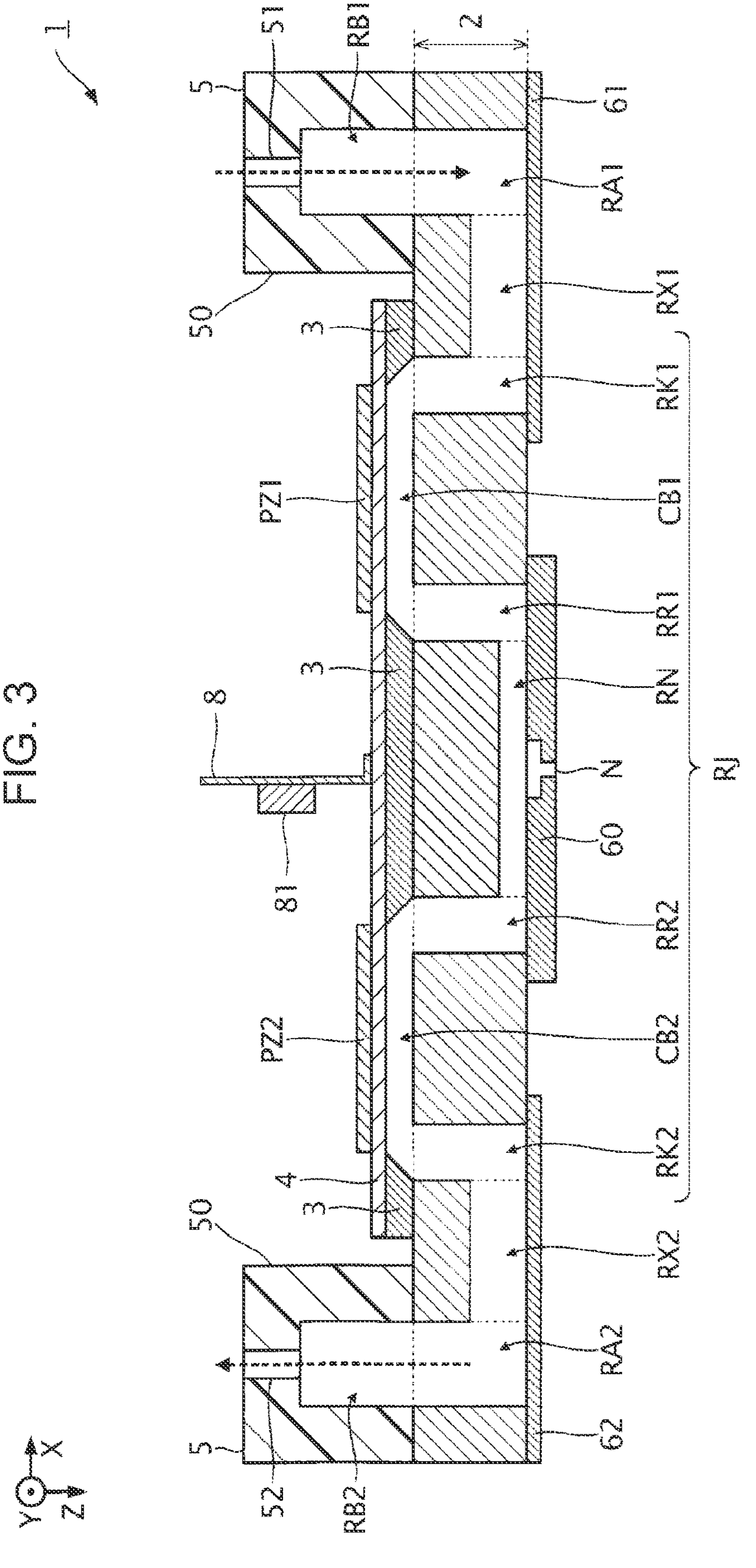
FIG. 3 is a cross-sectional view taken along the line III-III of FIG. 2.

With reference to FIGS. 2 and 3, an overview of the liquid ejecting head 1 is given below.

FIG. 2 is an exploded perspective view of the liquid ejecting head 1. FIG. 3 is a cross-sectional view taken along the line III-III of FIG. 2. The line III-III is a virtual line segment passing through a nozzle flow passage RN.

As illustrated in FIGS. 2 and 3, the liquid ejecting head 1 includes a nozzle substrate 60, a compliance sheet 61, a compliance sheet 62, a communication plate 2, a pressure compartment substrate 3, a vibrating plate 4, a reservoir forming substrate 5, and a wiring substrate 8.

As illustrated in FIGS. 2 and 3, the nozzle substrate 60 is a plate-like member that is elongated in the Y-axis direction and extends substantially in parallel with an X-Y plane. The concept of "substantially in parallel with" herein includes not only a case of being perfectly in parallel but also a case of being able to be deemed as parallel, with a margin of error taken into consideration. The nozzle substrate 60 is manufactured by, for example, processing a monocrystalline silicon substrate by using a semiconductor manufacturing technology such as etching. However, known materials and methods may be used for manufacturing the nozzle substrate 60. The nozzle N is a through hole provided in the nozzle substrate 60. In the present embodiment, as an example, it is assumed that the plurality M of nozzles N is provided in the nozzle substrate 60 to constitute a nozzle row Ln extending in the Y-axis direction.

As illustrated in FIGS. 2 and 3, the communication plate 2 is provided on the −Z side with respect to the nozzle substrate 60. The communication plate 2 is a plate-like member that is elongated in the Y-axis direction and extends substantially in parallel with an X-Y plane. Passages through which ink flows are formed in the communication plate 2.

Specifically, one supply flow passage RA1 and one discharge flow passage RA2 are formed in the communication plate 2. The supply flow passage RA1 is in communication with the supply flow passage RB1, which will be described later, and extends in the Y-axis direction. The discharge flow passage RA2 is in communication with the discharge flow passage RB2, which will be described later, and is provided on the −X side as viewed from the supply flow passage RA1 in such a way as to extend in the Y-axis direction.

Besides the supply flow passage RA1 and one discharge flow passage RA2, the following flow passages are formed in the communication plate 2: a plurality M of connection flow passages RK1 having one-to-one correspondence to the plurality M of nozzles N, a plurality M of connection flow passages RK2 having one-to-one correspondence to the plurality M of nozzles N, a plurality M of communication flow passages RR1 having one-to-one correspondence to the plurality M of nozzles N, a plurality M of communication flow passages RR2 having one-to-one correspondence to the plurality M of nozzles N, a plurality M of nozzle flow passages RN having one-to-one correspondence to the plurality M of nozzles N, one supply flow passage RX1, and one discharge flow passage RX2.

The supply flow passage RX1 may be a single shared supply passage provided in common for the plurality M of nozzles N. The discharge flow passage RX2 may be a single shared discharge passage provided in common for the plurality M of nozzles N. In the description below, it is assumed that each of the supply flow passage RX1 and the discharge flow passage RX2 is a single passage.

The supply flow passage RX1 is in communication with the supply flow passage RA1 and is provided on the −X side as viewed from the supply flow passage RA1 in such a way as to extend in the X-axis direction. The connection flow passage RK1 is in communication with the supply flow passage RX1 and is provided on the −X side as viewed from the supply flow passage RX1 in such a way as to extend in the Z-axis direction. The communication flow passage RR1 is provided on the −X side as viewed from the connection flow passage RK1 in such a way as to extend in the Z-axis direction. The connection flow passage RK2 is in communication with the discharge flow passage RX2 and is provided on the +X side as viewed from the discharge flow passage RX2 in such a way as to extend in the Z-axis direction. The discharge flow passage RX2 is in communication with the discharge flow passage RA2 and is provided on the +X side as viewed from the discharge flow passage RA2 in such a way as to extend in the X-axis direction. The communication flow passage RR2 is provided on the +X side as viewed from the connection flow passage RK2 and on the −X side as viewed from the communication flow passage RR1 in such a way as to extend in the Z-axis direction. The nozzle flow passage RN provides communication between the communication flow passage RR1 and the communication flow passage RR2. The nozzle flow passage RN is located between a pressure compartment CB1 and a pressure compartment CB2 as viewed in the −Z direction. The nozzle flow passage RN is in communication with the nozzle N corresponding to this nozzle flow passage RN. The nozzle flow passage RN extends in the X-axis direction. Ink is ejected from the nozzle N in the +Z direction.

The communication plate 2 is manufactured by, for example, processing a monocrystalline silicon substrate by using a semiconductor manufacturing technology. However, known materials and methods may be used for manufacturing the communication plate 2.

As illustrated in FIGS. 2 and 3, the pressure compartment substrate 3 is provided on the −Z side with respect to the communication plate 2. The pressure compartment substrate 3 is a plate-like member that is elongated in the Y-axis direction and extends substantially in parallel with an X-Y plane. Passages through which ink flows are formed in the pressure compartment substrate 3.

Specifically, a plurality M of pressure compartments CB1 having one-to-one correspondence to the plurality M of nozzles N and a plurality M of pressure compartments CB2 having one-to-one correspondence to the plurality M of nozzles N are formed in the pressure compartment substrate 3. The pressure compartment CB1 provides communication between the connection flow passage RK1 and the communication flow passage RR1. The pressure compartment CB1 is provided in such a way as to, when viewed in the Z-axis direction, connect the end of the connection flow passage RK1 on the +X side and the end of the communication flow passage RR1 on the −X side and to extend in the X-axis direction. The pressure compartment CB2 provides communication between the connection flow passage RK2 and the communication flow passage RR2. The pressure compartment CB2 is provided in such a way as to, when viewed in the Z-axis direction, connect the end of the connection flow passage RK2 on the −X side and the end of the communication flow passage RR2 on the +X side and to extend in the X-axis direction.

The pressure compartment substrate 3 is manufactured by, for example, processing a monocrystalline silicon substrate by using a semiconductor manufacturing technology. However, known materials and methods may be used for manufacturing the pressure compartment substrate 3.

In the description below, each ink flow passage providing communication between the supply flow passage RX1 and the discharge flow passage RX2 will be referred to as a circulation flow passage RJ. That is, communication between the supply flow passage RX1 and the discharge flow passage RX2 is provided by a plurality M of circulation flow passages RJ having one-to-one correspondence to the plurality M of nozzles N. Each of the plurality of circulation flow passages RJ includes, as described above, the connection flow passage RK1 that is in communication with the supply flow passage RX1, the pressure compartment CB1 that is in communication with the connection flow passage RK1, the communication flow passage RR1 that is in communication with the pressure compartment CB1, the nozzle flow passage RN that is in communication with the communication flow passage RR1, the communication flow passage RR2 that is in communication with the nozzle flow passage RN, the pressure compartment CB2 that is in communication with the communication flow passage RR2, and the connection flow passage RK2 that is in communication with the pressure compartment CB2.

The circulation flow passage RJ is an example of "a flow passage through which a liquid flows". The nozzle flow passage RN, a part of the circulation flow passage RJ, is an example of "a portion which is a part of the flow passage and with which the nozzle is in communication".

As illustrated in FIGS. 2 and 3, the vibrating plate 4 is provided on the −Z side with respect to the pressure compartment substrate 3. The vibrating plate 4 is a plate-like member that is elongated in the Y-axis direction and extends substantially in parallel with an X-Y plane. The vibrating plate 4 is a member that is able to vibrate elastically.

As illustrated in FIGS. 2 and 3, a plurality M of piezoelectric elements PZ1 having one-to-one correspondence to the plurality M of pressure compartments CB1 and a plurality M of piezoelectric elements PZ2 having one-to-one correspondence to the plurality M of pressure compartments CB2 are provided on the −Z surface of the vibrating plate 4. In the description below, the piezoelectric element PZ1 and the piezoelectric element PZ2 will be collectively referred to as "piezoelectric element PZq". The piezoelectric element PZq is a passive element that deforms in response to a change in the voltage level of the drive signal Com. In other words, the piezoelectric element PZq is an example of an energy producing element that produces, based on the electric energy of the drive signal Com, energy for ejecting ink. Ink is ejected from the nozzle N by utilizing the energy produced by the piezoelectric element PZq. In the description below, a suffix "q" may be added to reference signs that represent components or signals corresponding to the piezoelectric element PZq.

As mentioned above, the piezoelectric element PZq is driven to deform in response to a change in the voltage level of the drive signal Com. The vibrating plate 4 vibrates by being driven by the deformation of the piezoelectric element PZq. The vibration of the vibrating plate 4 causes changes in pressure inside the pressure compartment CBq. Because of the changes in pressure inside the pressure compartment CBq, ink with which the inside of the pressure compartment CBq is filled flows through the communication flow passage RRq and the nozzle flow passage RN to be ejected from the nozzle N.

As illustrated in FIGS. 2 and 3, the wiring substrate 8 is mounted on the −Z surface of the vibrating plate 4. The wiring substrate 8 is a component that provides electric connection between the control unit 90 and the liquid ejecting head 1. For example, a flexible wiring board such as FPC or FFC can be preferably used as the wiring substrate 8. FPC is an acronym for Flexible Printed Circuit. FFC is an acronym for Flexible Flat Cable. A drive circuit 81 is mounted on the wiring substrate 8. The drive circuit 81 is an electric circuit that performs switching as to whether or not to supply the drive signal Com to the piezoelectric element PZq under the control of the control signal SI. The drive circuit 81 supplies the drive signal Com to the piezoelectric element PZq.

In the description below, the drive signal Com supplied to the piezoelectric element PZ1 may be referred to as "drive signal Com1", and the drive signal Com supplied to the piezoelectric element PZ2 may be referred to as "drive signal Com2". In the present embodiment, it is assumed that, when ink is to be ejected from the nozzle N, the waveform of the drive signal Com1 that is supplied to the piezoelectric element PZ1 corresponding to the nozzle N by the drive circuit 81 is substantially the same as the waveform of the drive signal Com2 that is supplied to the piezoelectric element PZ2 corresponding to the nozzle N by the drive circuit 81. The concept of "substantially the same" herein includes not only a case of being perfectly the same but also a case of being able to be deemed as the same, with a margin of error taken into consideration.

As illustrated in FIGS. 2 and 3, the reservoir forming substrate 5 is provided on the −Z side with respect to the vibrating plate 4. The reservoir forming substrate 5 is a member that is elongated in the Y-axis direction. Passages through which ink flows are formed in the reservoir forming substrate 5.

Specifically, one supply flow passage RB1 and one discharge flow passage RB2 are formed in the reservoir forming substrate 5. The supply flow passage RB1 is in communication with the supply flow passage RA1 and is provided on the −Z side as viewed from the supply flow passage RA1 in such a way as to extend in the Y-axis direction. The discharge flow passage RB2 is in communication with the discharge flow passage RA2 and is provided on the −Z side as viewed from the discharge flow passage RA2 and on the −X side as viewed from the supply flow passage RB1 in such a way as to extend in the Y-axis direction.

A feed inlet 51, which is in communication with the supply flow passage RB1, and a discharge outlet 52, which is in communication with the discharge flow passage RB2, are provided in the reservoir forming substrate 5. Ink is supplied from the liquid container 93 into the supply flow passage RB1 through the feed inlet 51. Ink is collected from the discharge flow passage RB2 through the discharge outlet 52.

The reservoir forming substrate 5 has an opening 50. The pressure compartment substrate 3, the vibrating plate 4, and the wiring substrate 8 are provided inside the opening 50.

The reservoir forming substrate 5 is formed by, for example, injection molding of a resin material. However, known materials and methods may be used for manufacturing the reservoir forming substrate 5.

In the present embodiment, ink supplied to the feed inlet 51 from the liquid container 93 flows through the supply flow passage RB1 into the supply flow passage RA1. Then, a part of the ink that has flowed into the supply flow passage RA1 flows through the supply flow passage RX1 and the connection flow passage RK1 into the pressure compartment CB1. A part of the ink that has flowed into the pressure compartment CB1 flows through the communication flow passage RR1, the nozzle flow passage RN, and the communication flow passage RR2 into the pressure compartment CB2. Then, a part of the ink that has flowed into the pressure compartment CB2 flows through the connection flow passage RK2, the discharge flow passage RX2, the discharge flow passage RA2, and the discharge flow passage RB2 to be discharged from the discharge outlet 52.

When the piezoelectric element PZ1 is driven by the drive signal Com1, a part of ink with which the inside of the pressure compartment CB1 is filled flows through the communication flow passage RR1 and the nozzle flow passage RN to be ejected from the nozzle N. When the piezoelectric element PZ2 is driven by the drive signal Com2, a part of ink with which the inside of the pressure compartment CB2 is filled flows through the communication flow passage RR2 and the nozzle flow passage RN to be ejected from the nozzle N.

As illustrated in FIGS. 2 and 3, the compliance sheet 61 is provided on the +Z surface of the communication plate 2 in such a way as to hermetically close the supply flow passage RA1, the supply flow passage RX1, and the connection flow passage RK1. The compliance sheet 61 is made of an elastic material. The compliance sheet 61 absorbs the pressure fluctuations of ink inside the supply flow passage RA1, the supply flow passage RX1, and the connection flow passage RK1. The compliance sheet 62 is provided on the +Z surface of the communication plate 2 in such a way as to hermetically close the discharge flow passage RA2, the discharge flow passage RX2, and the connection flow passage RK2. The compliance sheet 62 is made of an elastic material. The compliance sheet 62 absorbs the pressure fluctuations of ink inside the discharge flow passage RA2, the discharge flow passage RX2, and the connection flow passage RK2.

As explained above, in the liquid ejecting head 1 according to the present embodiment, ink is circulated from the supply flow passage RX1 to the discharge flow passage RX2 via the circulation flow passage RJ. For this reason, in the present embodiment, even if there is a period during which no ink inside the pressure compartment CBq is ejected from the nozzle N, it is possible to prevent the ink from remaining stayed inside the pressure compartment CBq, the nozzle flow passage RN, etc. Therefore, in the present embodiment, even if there is a period during which no ink inside the pressure compartment CBq is ejected from the nozzle N, it is possible to prevent the viscosity of the ink inside the pressure compartment CBq from increasing. This makes it possible to prevent the occurrence of ejection abnormality in which it is impossible to perform ejection from the nozzle N properly due to the increased viscosity of the ink.

Moreover, the liquid ejecting head 1 according to the present embodiment is able to eject ink contained inside the pressure compartment CB1 and is able to eject ink contained inside the pressure compartment CB2, from the nozzle N. For this reason, for example, as compared with an embodiment in which ink contained inside a single pressure compartment CBq only is ejected from the nozzle N, it is possible to increase the amount of ink ejected from the nozzle N.

1.2. Shape of Nozzle N

Figure 4:
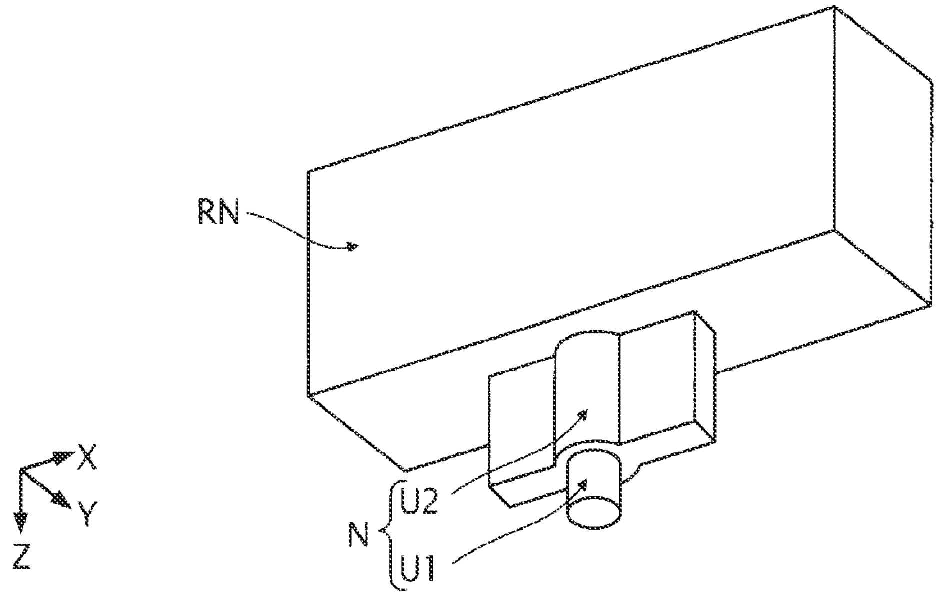
FIG. 4 is a perspective view of the neighborhood of a nozzle N.
Figure 5:
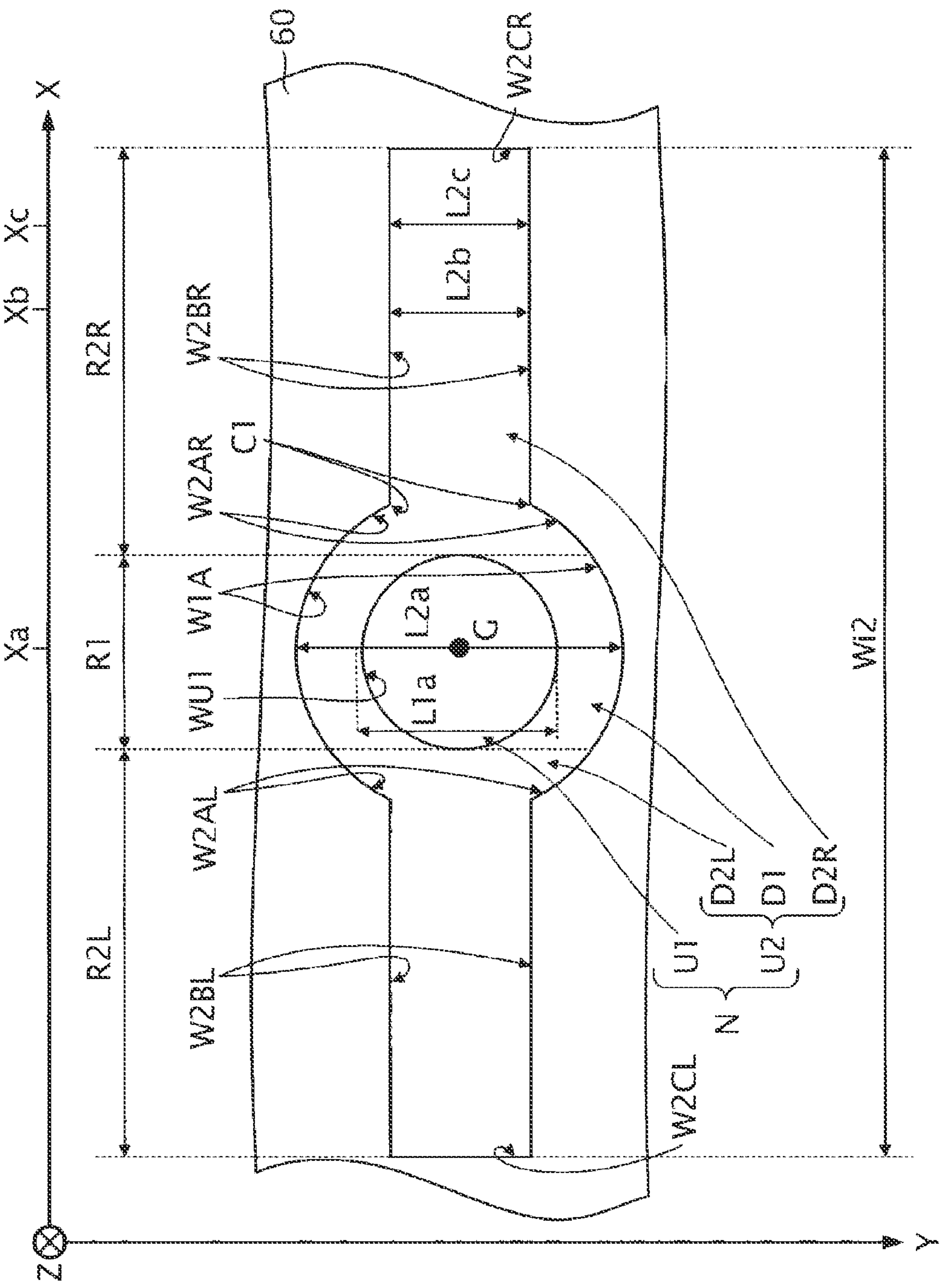
FIG. 5 is a plan view of the nozzle N.
Figure 6:
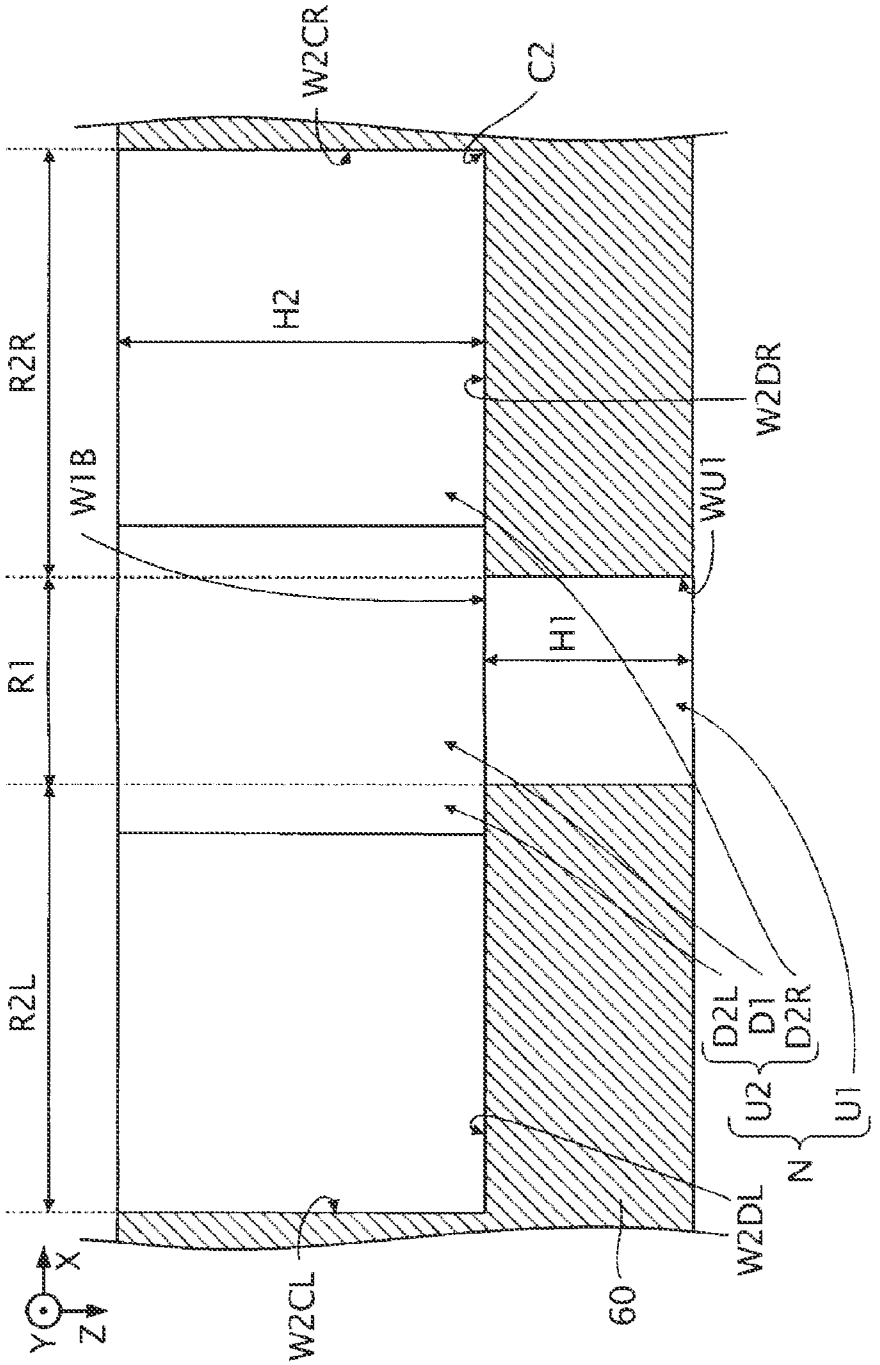
FIG. 6 is a diagram for explaining a lateral structure of the nozzle N.

With reference to FIGS. 4, 5, and 6, the shape of the nozzle N will now be explained.

FIG. 4 is a perspective view of the neighborhood of the nozzle N. In FIG. 4, the shape of any one of the plurality M of nozzles N is illustrated. In addition, the nozzle flow passage RN that is in communication with this nozzle N is illustrated. FIG. 5 is a plan view of the nozzle N. FIG. 6 is a diagram for explaining a lateral structure of the nozzle N.

Specifically, FIG. 6 depicts a cross section of the nozzle substrate 60 taken in parallel with an X-Z plane in such a way as to go across the nozzle N.

As illustrated in FIGS. 4, 5, and 6, the nozzle N includes a first portion U1 and a second portion U2, the latter of which is located closer to the circulation flow passage RJ along the +Z direction than the former is. The first portion U1 has a substantially round columnar shape extending in the Z-axis direction. The second portion U2 has a hybrid shape obtained by combining a substantially round columnar shape extending in the Z-axis direction and a substantially rectangular parallelepipedic shape extending in the Z-axis direction at a position where the barycenter of the former and the barycenter of the latter overlap with each other in a plan view in the Z-axis direction. In other words, the second portion U2 has a hybrid shape obtained by, in a plan view, combining a substantial circle and a substantial rectangle at a position where the barycenter of the former and the barycenter of the latter overlap with each other. The term "barycenter" as used herein means a centroid point where the sum for the first moment of area of the shape of interest is zero. In the description below, a plan view in the Z-axis direction will be simply referred to as "plan view". In a plan view, the barycenter of the first portion U1 and the barycenter of the second portion U2 lie at substantially the same position, that is, a point G. The concept of "substantially the same" herein includes not only a case of being perfectly the same but also a case of being able to be deemed as the same, with a margin of manufacturing error taken into consideration.

An example of the dimensions of the nozzle N will now be described. In a plan view, the first portion U1 has a substantially circular shape having a diameter of approximately 20 μm. Therefore, the maximum width L1*a* of the first portion U1 in the Y-axis direction in the example illustrated in FIG. 5 is approximately 20 μm. In a plan view, the second portion U2 has a hybrid shape obtained by combining a substantial circle having a diameter of approximately 37.5 μm and a substantial rectangle having a length in the X-axis direction of approximately 112.5 μm and a length in the Y-axis direction of approximately 15 μm at a position where the barycenter of the former and the barycenter of the latter overlap with each other. Therefore, the maximum width Wi2 of the second portion U2 in the X-axis direction in the example illustrated in FIG. 5 is approximately 112.5 μm. The maximum width L2*a* of the second portion U2 in the Y-axis direction in the example illustrated in FIG. 5 is approximately 37.5 μm. The width L2*b* of the second portion U2 in the Y-axis direction at a region where its wall surface extends linearly in the X-axis direction in the example illustrated in FIG. 5 is approximately 15 μm. The width H1 of the first portion U1 in the +Z direction in the example illustrated in FIG. 6 is approximately 20 μm. The width H2 of the second portion U2 in the +Z direction in the example illustrated in FIG. 6 is approximately 55 μm.

As illustrated in FIG. 5, in a plan view, the cross-sectional area size of the first portion U1 is smaller than the cross-sectional area size of the second portion U2. Therefore, it is possible to position the first portion U1 inside the second portion U2 in a plan view. The phrase "in a plan view" may be paraphrased as "when viewed in the +Z direction". Configuring the cross-sectional area size of the first portion U1 relatively small makes it possible to increase the velocity of ejection, etc. Configuring the cross-sectional area size of the second portion U2 relatively large makes it possible to enhance the efficiency of supply from the nozzle flow passage RN.

A further detailed explanation of the shape of the nozzle N will be given below while making reference to a first region R1 and a second region R2. The first region R1 is a region where the second portion U2 overlaps with the first portion U1 in the X-axis direction. The second region R2 is a region where the second portion U2 does not overlap with the first portion U1 in the X-axis direction. The second region R2 includes a second region R2L, which is located on the −X side with respect to the first region R1, and a second region R2R, which is located on the +X side with respect to the first region R1. In the description below, the term "second region R2" will be used for collectively referring to the second region R2L and the second region R2R. In the description below, the portion that is a part of the second portion U2 and is included in the first region R1 will be referred to as "overlapping portion D1", and the portion that is a part of the second portion U2 and is included in the second region R2 will be referred to as "non-overlapping portion D2". The non-overlapping portion D2 includes a non-overlapping portion D2L, which is located on the −X side with respect to the overlapping portion D1, and a non-overlapping portion D2R, which is located on the +X side with respect to the overlapping portion D1. In the description below, the term "non-overlapping portion D2" will be used for collectively referring to the non-overlapping portion D2L and the non-overlapping portion D2R. In a plan view, a part of the substantial circle of the second portion U2 is included in the overlapping portion D1. The rest of the substantial circle, and the rectangle, of the second portion U2 are included in the non-overlapping portion D2.

As illustrated in FIG. 5, the width of the overlapping portion D1 in the Y-axis direction is greater than the width of the non-overlapping portion D2 in the Y-axis direction. The width of the overlapping portion D1 in the Y-axis direction varies depending on which position in the X-axis direction it is measured at. The width of the non-overlapping portion D2 in the Y-axis direction also varies depending on which position in the X-axis direction it is measured at. However, the width of the overlapping portion D1 in the Y-axis direction is greater than the width of the non-overlapping portion D2 in the Y-axis direction regardless of which position in the X-axis direction they are measured at. For example, the maximum width L2*a* of the second portion U2 in the Y-axis direction, which is an example of the width of the overlapping portion D1 in the Y-axis direction, is greater than the width L2*b* of the non-overlapping portion D2 in the Y-axis direction, which is an example of the width of the non-overlapping portion D2 in the Y-axis direction.

The ratio of the width of the non-overlapping portion D2 in the Y-axis direction to the width of the overlapping portion D1 in the Y-axis direction is 20% or greater and 50% or less. The width of the overlapping portion D1 in the Y-axis direction is, for example, the maximum width L2*a* of the overlapping portion D1 in the Y-axis direction, or in other words, the width in the Y-axis direction of the portion that is a part of the overlapping portion D1 and is located at a position Xa in the X-axis direction. As illustrated in FIG. 5, the position Xa is the position of the point G in the X-axis direction. The width of the non-overlapping portion D2 in the Y-axis direction is, for example, the width of the rectangular portion included in the non-overlapping portion D2 in the Y-axis direction. The width of the rectangular portion included in the non-overlapping portion D2 in the Y-axis direction is the width L2*b*. The ratio of the width L2*b* to the maximum width L2*a* falls within the range of 20% or greater and 50% or less. For example, the maximum width L2*a* described above is approximately 37.5 μm, and the width L2*b* described above is approximately 15 μm, and, therefore, the ratio of the width L2*b* to the maximum width L2*a* is 15/37.5=0.4=40%, which falls within the range of 20% or greater and 50% or less.

As illustrated in FIG. 5, the width of the overlapping portion D1 in the Y-axis direction is greater than the width of the first portion U1 in the Y-axis direction. The width of the overlapping portion D1 in the Y-axis direction varies depending on which position in the X-axis direction it is measured at. However, the width of the overlapping portion D1 in the Y-axis direction is greater than the width of the first portion U1 in the Y-axis direction regardless of which position in the X-axis direction it is measured at.

Moreover, in the first embodiment, the ratio of the width of the first portion U1 in the Y-axis direction to the width of the overlapping portion D1 in the Y-axis direction is 20% or greater and 60% or less. For example, when measured at the position Xa in the X-axis direction, the width of the overlapping portion D1 in the Y-axis direction is the maximum width L2*a*, and the width of the first portion U1 in the Y-axis direction is the maximum width L1*a*. The maximum width L2*a* described above is approximately 37.5 μm, and the width L1*a* described above is approximately 20 μm, and, therefore, the ratio of the maximum width L1*a* to the maximum width L2*a* is 20/37.5=approx. 0.53=53%, which falls within the range of 20% or greater and 60% or less.

As illustrated in FIG. 5, the width of the first portion U1 in the Y-axis direction is greater than the width of the non-overlapping portion D2 in the Y-axis direction. The width of the first portion U1 in the Y-axis direction is, for example, the maximum width L1*a*. The width of the non-overlapping portion D2 in the Y-axis direction is, for example, the width L2*b*. The maximum width L1*a* described above is approximately 20 μm, and the width L2*b* described above is approximately 15 μm, and, therefore, the maximum width L1*a* is greater than the width L2*b*.

As described earlier, in a plan view, the first portion U1 has a substantially circular shape. Therefore, in a plan view, the wall surface WU1 of the first portion U1 has a substantially circular shape having its center at the point G. As described earlier, in a plan view, the second portion U2 has a hybrid shape obtained by combining a substantial circle and a substantial rectangle, and a part of the substantially circular portion is included in the overlapping portion D1. Therefore, as illustrated in FIG. 5, in a plan view, the overlapping portion D1 has two wall surfaces W1A. In a plan view, the two wall surfaces W1A are located line-symmetrically with respect to a virtual line going along the X axis through the point G. Each of the two wall surfaces W1A has an arc shape centering at the point G. That is, the width of the overlapping portion D1 in the Y-axis direction throughout positions in the X-axis direction increases gradually from the both-end portion of the overlapping portion D1 toward the central portion of the overlapping portion D1. The both-end portion of the overlapping portion D1 is the junction with the non-overlapping portion D2. The central portion of the overlapping portion D1 is the portion located at the position Xa in the X-axis direction.

As illustrated in FIG. 5, in a plan view, the non-overlapping portion D2R has two wall surfaces W2AR, two wall surfaces W2BR, and a wall surface W2CR. In a plan view, the two wall surfaces W2AR are located line-symmetrically with respect to a virtual line going along the X axis through the point G. Similarly, in a plan view, the two wall surfaces W2BR are located line-symmetrically with respect to a virtual line going along the X axis through the point G. The non-overlapping portion D2L has two wall surfaces W2AL, two wall surfaces W2BL, and a wall surface W2CL.

In a plan view, the wall surfaces of the non-overlapping portion D2L are line-symmetrical to those of the non-overlapping portion D2R with respect to a virtual line going along the Y axis through the point G. Therefore, an explanation of the wall surfaces of the non-overlapping portion D2L is omitted.

In a plan view, each of the two wall surfaces W2AR is connected at its −X-side end to either one of the two wall surfaces W1A and has an arc shape centering at the point G. In a plan view, each of the two wall surfaces W2BR is connected at its −X-side end to either one of the two wall surfaces W2AR and extends in the X-axis direction. Two corners C1 are formed by connection between the wall surface W2AR located on the −Y side and the wall surface W2BR located on the −Y side and connection between the wall surface W2AR located on the +Y side and the wall surface W2BR located on the +Y side. In a plan view, the wall surface W2CR is connected at its +Y-side end to the wall surface W2BR and at its −Y-side end to the wall surface W2BR and extends in the Y-axis direction. The width in the Y-axis direction of the portion formed between the two wall surfaces W2BR, among the wall surfaces of the non-overlapping portion D2R, is substantially constant throughout positions in the X-axis direction. The portion formed between the two wall surfaces W2BR is, in a plan view, the rectangular portion of the second portion U2. For example, the width L2*b* in the Y-axis direction of the portion that is a part of the non-overlapping portion D2R and is located at a position Xb in the X-axis direction is substantially the same as the width L2*c* in the Y-axis direction of the portion that is a part of the non-overlapping portion D2R and is located at a position Xc in the X-axis direction. The Xb-positional portion in the X-axis direction is, in a plan view, included in the rectangular portion of the non-overlapping portion D2R. The Xc-positional portion in the X-axis direction is, in a plan view, included in the rectangular portion of the non-overlapping portion D2R and is located on the +X side with respect to the position Xb.

As illustrated in FIG. 5, the maximum width Wi2 of the second portion U2 in the X-axis direction is greater than the maximum width L2*a* of the second portion U2 in the Y-axis direction. More particularly, the ratio of the maximum width L2*a* of the second portion U2 in the Y-axis direction to the maximum width Wi2 of the second portion U2 in the X-axis direction is less than 40%. For example, the maximum width Wi2 described above is approximately 112.5 μm, and the maximum width L2*a* described above is approximately 37.5 μm, and, therefore, the ratio of the width L2*a* to the maximum width Wi2 is 37.5/112.5=approx. 0.33=33%, which is less than 40%.

As illustrated in FIG. 6, as viewed in the +Y direction, the first portion U1 has a substantially square shape, and the second portion U2 has a rectangular shape. As viewed in the +Y direction, the overlapping portion D1 has a wall surface W1B. The wall surface W1B is a surface extending along an X-Y plane. The wall surface W1B is connected to the wall surfaces W1A and the wall surface WU1. As viewed in the +Y direction, the non-overlapping portion D2R has a wall surface W2CR and a wall surface W2DR. As viewed in the +Y direction, the non-overlapping portion D2L has a wall surface W2CL and a wall surface W2DL.

As viewed in the +Y direction, the wall surfaces of the non-overlapping portion D2L are line-symmetrical to those of the non-overlapping portion D2R with respect to the central axis of the first portion U1. Therefore, an explanation of the wall surfaces of the non-overlapping portion D2L is omitted.

A corner C2 is formed by connection between the wall surface W2CR and the wall surface W2DR. As viewed in the +Y direction, the wall surface W2CR is connected at its +Z-side end to the wall surface W2DR and extends in the Z-axis direction. As viewed in the +Y direction, the wall surface W2DR is connected at its −X-side end to the wall surface WU1 and the wall surface W1B and extends in the X-axis direction. The width H2 of the second portion U2 in the +Z direction is greater than the width H1 of the first portion U1 in the +Z direction.

1.3. Summary of First Embodiment

As described above, the liquid ejecting head 1 according to the first embodiment includes the circulation flow passage RJ through which ink flows, the piezoelectric element PZq that produces energy for ejecting the ink, and the nozzle N that ejects the ink by utilizing the energy produced by the piezoelectric element PZq. The nozzle flow passage RN, which is a part of the circulation flow passage RJ and with which the nozzle N is in communication, extends in the X-axis direction. The X-axis direction is an example of "first direction". The +Z direction, in which the ink is ejected from the nozzle N and which is orthogonal to the X-axis direction, is an example of "second direction". The Y-axis direction, which is orthogonal to the X-axis direction and the +Z direction, is an example of "third direction". The nozzle N includes the first portion U1 and the second portion U2. The second portion U2 is located closer to the circulation flow passage RJ along the +Z direction than the first portion U1 is. The cross-sectional area size of the first portion U1 when viewed in the +Z direction is smaller than the cross-sectional area size of the second portion U2 when viewed in the +Z direction. The width of the overlapping portion D1, which is a part of the second portion U2 and is included in the first region R1, in the Y-axis direction is greater than the width of the non-overlapping portion D2, which is a part of the second portion U2 and is included in the second region R2, in the Y-axis direction. The first region R1 is a region where the second portion U2 overlaps with the first portion U1 in the X-axis direction. The second region R2 is a region where the second portion U2 does not overlap with the first portion U1 in the X-axis direction.

Figure 7:
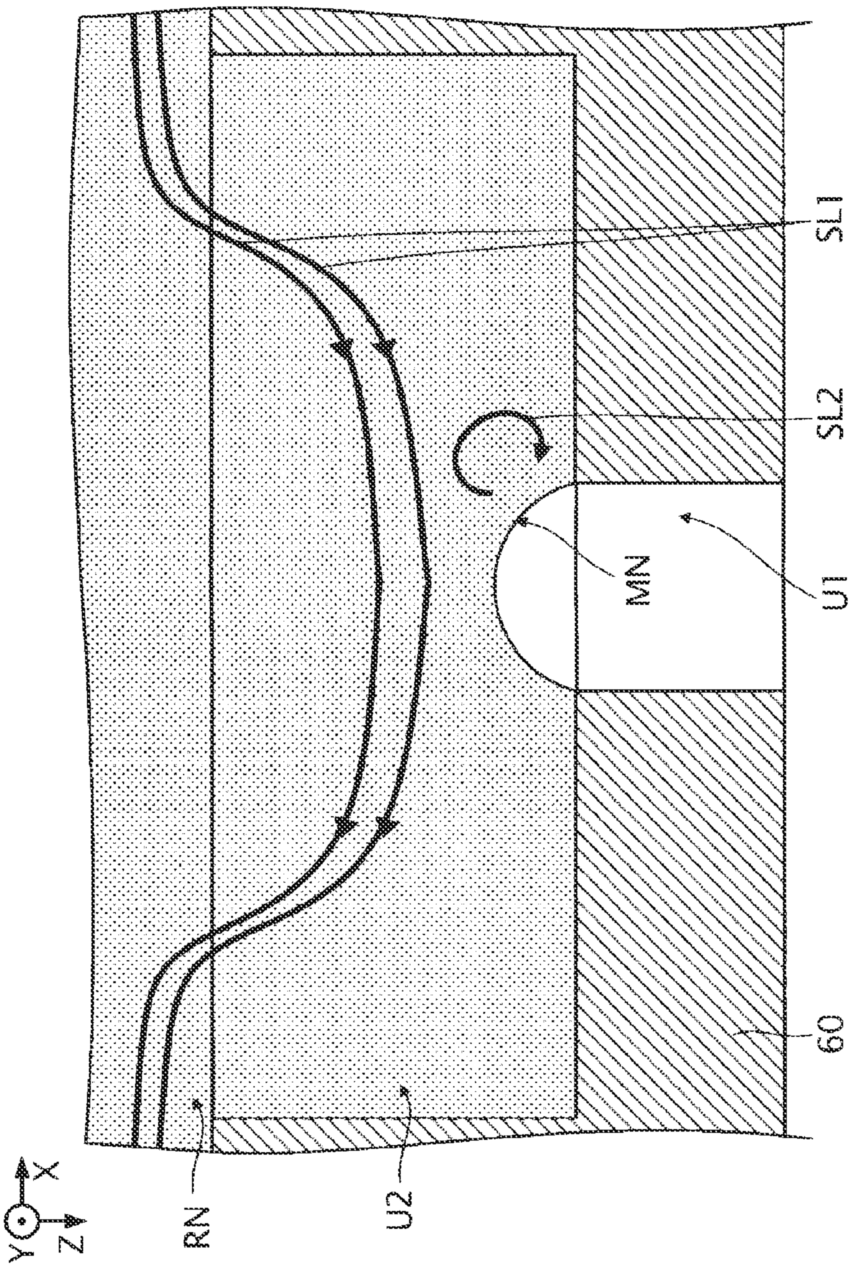
FIG. 7 is a diagram for explaining the collapsing of a meniscus.

In a comparative example in which the width of the overlapping portion D1 in the Y-axis direction is the same as the width of the non-overlapping portion D2 in the Y-axis direction and in which both of these widths are large, there is a risk that the collapsing of a meniscus might occur due to the collision, with the meniscus, of a stream that goes into the second portion U2 from the nozzle flow passage RN when the meniscus is pulled into the second portion U2. If the meniscus collapses, ejection stability might be impaired due to the forming of an air bubble in the liquid. With reference to FIG. 7, the collapsing of a meniscus will now be explained.

FIG. 7 is a diagram for explaining the collapsing of a meniscus. FIG. 7 depicts a cross section of a liquid ejecting head 1 according to a comparative example taken in parallel with an X-Z plane in such a way as to go across the nozzle N. Specifically, a state in which a meniscus MN formed inside the nozzle N is pulled in the −Z direction is illustrated. The shaded portion in FIG. 7 indicates the portion filled with ink.

Due to the presence of the non-overlapping portion D2, a stream that goes into the second portion U2 from the nozzle flow passage RN is generated. A streamline SL1 illustrated as an example in FIG. 7 indicates the flow curve of the stream that goes into the second portion U2 from the nozzle flow passage RN. Moreover, as illustrated in FIG. 7, if the width of the overlapping portion D1 in the Y-axis direction is the same as the width of the non-overlapping portion D2 in the Y-axis direction, it is likely that a vortex flow indicated by a streamline SL2 in FIG. 7 will be produced. If the vortex flow collides with the meniscus MN, the collapsing of the meniscus occurs, and ejection stability might be impaired due to the forming of an air bubble in the ink.

In the present embodiment, the width of the overlapping portion D1 in the Y-axis direction is greater than the width of the non-overlapping portion D2 in the Y-axis direction. To put it the other way around, in the present embodiment, the width of the non-overlapping portion D2 in the Y-axis direction is less than the width of the overlapping portion D1 in the Y-axis direction. As compared with the comparative example, this structure makes the resistance of the non-overlapping portion D2 higher. Therefore, it is possible to suppress the occurrence of a vortex flow. Suppressing the occurrence of a vortex flow makes it possible to suppress a decrease in ejection stability.

In another comparative example, in which the width of the overlapping portion D1 in the Y-axis direction is the same as the width of the non-overlapping portion D2 in the Y-axis direction and in which both of these widths are small, when a meniscus MN is produced, there is no sufficient bypassing space at the overlapping portion D1 for the ink that has flowed from the non-overlapping portion D2. There is a risk that the bypassing space insufficiency makes it easier for the collision of the flow of the ink with the meniscus MN to occur, resulting in the collapsing of the meniscus MN.

For the reasons described above, it is possible to prevent or reduce the collapsing of the meniscus MN and thus enhance ejection stability by relatively increasing the width of the overlapping portion D1 in the Y-axis direction and relatively decreasing the width of the non-overlapping portion D2 in the Y-axis direction.

In the present embodiment, the ratio of the width of the non-overlapping portion D2 in the Y-axis direction to the width of the overlapping portion D1 in the Y-axis direction is 20% or greater and 50% or less. The width of the overlapping portion D1 in the Y-axis direction is, for example, the maximum width L2*a*. The width of the non-overlapping portion D2 in the Y-axis direction is, for example, the width L2*b*.

If the ratio of the width L2*b* to the width L2*a* is greater than 50%, the possibility of occurrence of a vortex flow inside the second portion U2 increases and, therefore, the possibility of the collapsing of the meniscus MN increases. If the ratio of the width L2*b* to the width L2*a* is less than 20%, it is harder for a stream to go into the second portion U2 from the nozzle flow passage RN. When it is harder for a stream to go into the second portion U2 from the nozzle flow passage RN, it is harder for ink having increased viscosity inside the second portion U2 to be stirred. The entry of ink from the nozzle flow passage RN into the second portion U2 will now be explained with reference to FIGS. 8 and 9.

Figure 8:
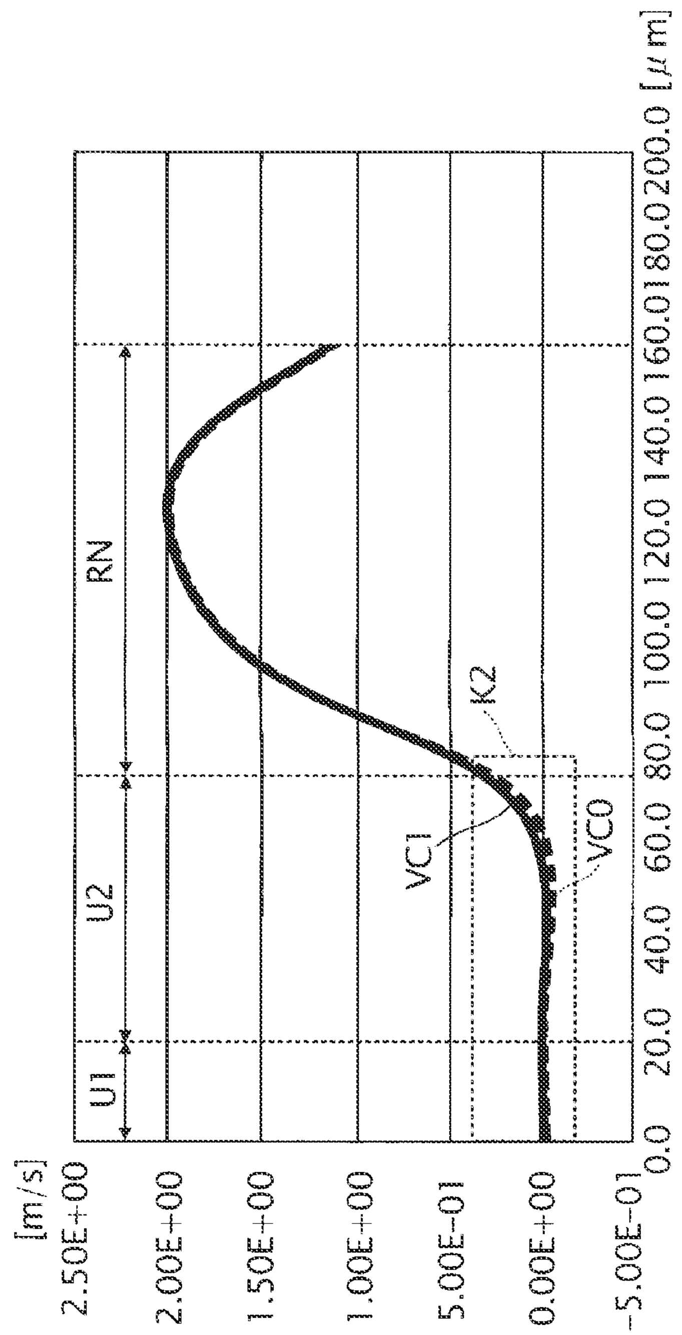
FIG. 8 is a diagram for explaining the entry of ink from a nozzle flow passage RN into a second portion U2.

FIG. 8 is a diagram for explaining the entry of ink from the nozzle flow passage RN into the second portion U2. The graph K1 illustrated in FIG. 8 shows a relation found by a fluid analysis simulation between positions in the Z-axis direction and flow velocity. The horizontal axis of the graph K1 represents positions in the Z-axis direction when the position of the +Z-side surface of the nozzle substrate 60 in the Z-axis direction is defined as 0 and when the −Z direction is defined as the positive direction. The positions from 0 μm to approximately 20 μm in the −Z direction on the Z axis are included in the first portion U1. The positions from approximately 20 μm to approximately 75 μm in the −Z direction on the Z axis are included in the second portion U2. The positions from approximately 75 μm to approximately 160 μm in the −Z direction on the Z axis are included in the nozzle flow passage RN. The vertical axis of the graph K1 represents flow velocity when the −X direction is defined as the positive direction. In the graph K1, "E+00" denotes 10°, and "E-01" denotes $10^{-1}$. For example, "2.50E+00" is 2.5 m/s, where m/s means meter per second.

In the graph K1, flow velocity characteristics VC1 according to the present embodiment, and flow velocity characteristics VC0 of a structure in which the width L2*b* is zero, that is, a structure in which the second portion U2 is constituted of a circle only in a plan view, are shown. In order to show the difference between the flow velocity characteristics VC1 and the flow velocity characteristics VC0 clearly, an area K2 in the graph K1 is enlarged in FIG. 9.

Figure 9:
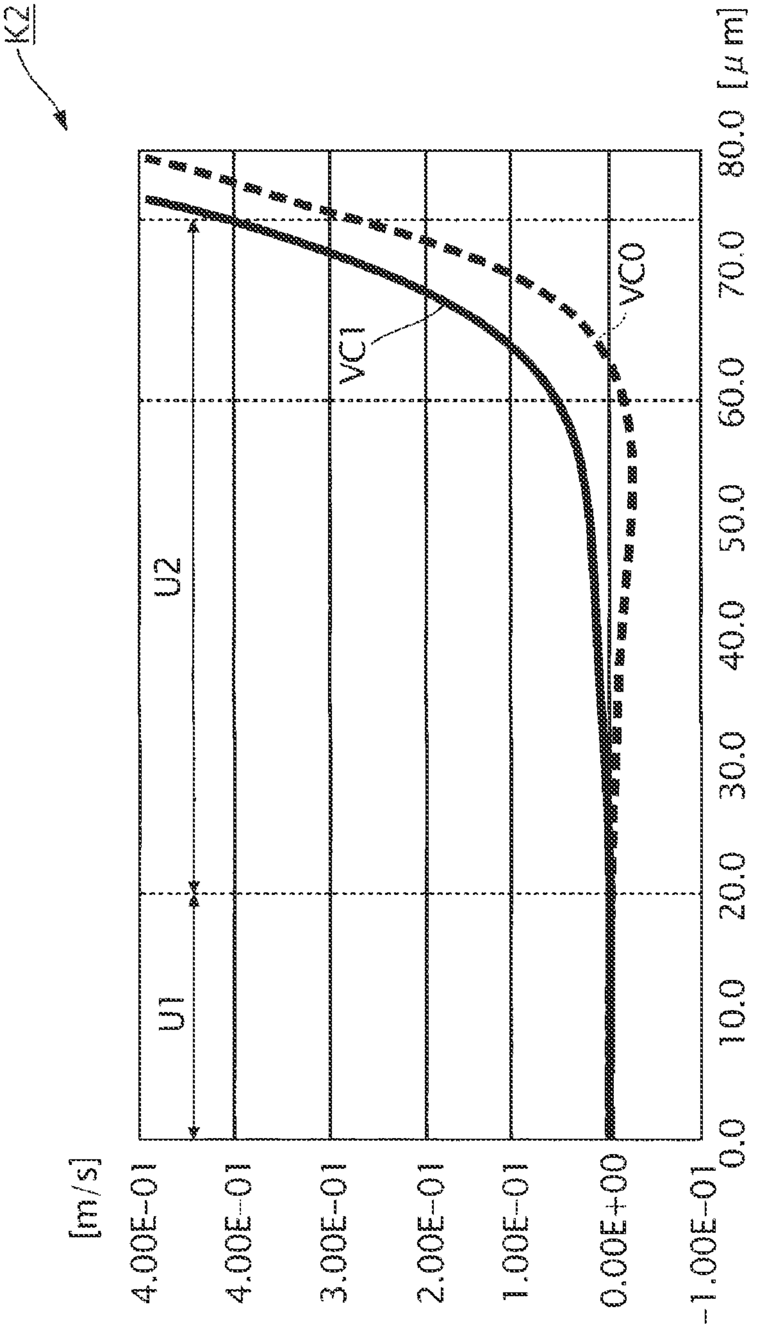
FIG. 9 is an enlarged graph of an area K2.

FIG. 9 is an enlarged graph of the area K2. As shown by the flow velocity characteristics VC1 and the flow velocity characteristics VC0, throughout the entire area of the second portion U2, flow velocity at the second portion U2 according to the first embodiment is higher than flow velocity at the second portion U2 of the structure in which the second portion U2 is constituted of a circle only in a plan view. For example, at the position of approximately 60 μm in the −Z direction from the +Z-side surface of the nozzle substrate 60, flow velocity according to the first embodiment is approximately $6.0\times10^{-2}$ m/s as shown by the flow velocity characteristics VC1, whereas flow velocity of the structure in which the second portion U2 is constituted of a circle only in a plan view is approximately 0 m/s as shown by the flow velocity characteristics VC0. The higher the flow velocity is, the greater the entry from the nozzle flow passage RN into the second portion U2 is. When it is easier for a stream to go into the second portion U2 from the nozzle flow passage RN, it is easier for ink having increased viscosity inside the second portion U2 to be stirred.

As described above, in the first embodiment, since the ratio of the width L2*b* to the maximum width L2*a* is 20% or greater, it is possible to stir ink having increased viscosity inside the second portion U2; therefore, it is possible to prevent the occurrence of ejection abnormality that makes it impossible to perform ink ejection from the nozzle N properly due to the thickening of the ink. Moreover, since the ratio of the width L2*b* to the maximum width L2*a* is 50% or less, it is possible to suppress the occurrence of a vortex flow and thus prevent or reduce the collapsing of the meniscus MN, resulting in enhanced ejection stability.

As illustrated in FIG. 5, the width of the overlapping portion D1 in the Y-axis direction is greater than the width of the first portion U1 in the Y-axis direction. The width of the overlapping portion D1 in the Y-axis direction is, for example, the maximum width L2*a*. The width of the first portion U1 in the Y-axis direction is, for example, the maximum width L1*a*.

If the width of the overlapping portion D1 in the Y-axis direction is equal to or less than the width of the first portion U1 in the Y-axis direction, it means that the ejecting portion becomes wider in the +Z direction. This structure makes ejection performance lower. The ejection performance is either one, or both, of the amount of ink ejected and the velocity of ink ejected. As compared with a structure in which the width of the overlapping portion D1 in the Y-axis direction is equal to or less than the width of the first portion U1 in the Y-axis direction, it is possible to offer higher ejection performance by making the width of the overlapping portion D1 in the Y-axis direction greater than the width of the first portion U1 in the Y-axis direction.

The ratio of the width of the first portion U1 in the Y-axis direction to the width of the overlapping portion D1 in the Y-axis direction is 20% or greater and 60% or less.

If the first portion U1 is too narrow in the Y-axis direction in relation to the width of the overlapping portion D1 in the Y-axis direction, the amount of ejection will be small, and clogging with ink is prone to occur. On the other hand, if the first portion U1 is too wide in the Y-axis direction in relation to the width of the overlapping portion D1 in the Y-axis direction, ejection performance will be low due to the excessive width of the ejecting portion on the +Z side. As compared with a structure in which the ratio of the width of the first portion U1 in the Y-axis direction to the width of the overlapping portion D1 in the Y-axis direction is less than 20%, the structure of the present embodiment makes it possible to prevent the amount of ejection from being small and makes it possible to prevent clogging with ink. As compared with a structure in which the ratio of the width of the first portion U1 in the Y-axis direction to the width of the overlapping portion D1 in the Y-axis direction is greater than 60%, the structure of the present embodiment makes it possible to prevent a decrease in ejection performance.

The width of the first portion U1 in the Y-axis direction is greater than the width of the non-overlapping portion D2 in the Y-axis direction. The width of the first portion U1 in the Y-axis direction is, for example, the maximum width L1*a*. The width of the non-overlapping portion D2 in the Y-axis direction is, for example, the width L2*b*.

Since the maximum width L1*a* is greater than the width L2*b*, as compared with a structure in which the maximum width L1*a* is equal to or less than the width L2, it is possible to eject ink even if the viscosity of the ink is high. In addition, it is possible to eject a larger droplet. Moreover, it is possible to prevent clogging with ink.

As illustrated in FIG. 5, the width of the overlapping portion D1 in the Y-axis direction throughout positions in the X-axis direction increases gradually from the both-end portion of the overlapping portion D1 toward the central portion of the overlapping portion D1. Since the width of the overlapping portion D1 in the Y-axis direction throughout positions in the X-axis direction increases gradually in this way, as compared with a structure in which at least one of the two wall surfaces W1A of the overlapping portion D1 has a corner, the flow of ink is smoother.

As illustrated in FIG. 5, the width in the Y-axis direction of the portion formed between the wall surfaces W2BR extending in the X-axis direction, among the wall surfaces of the non-overlapping portion D2R, is substantially constant throughout positions in the X-axis direction. The width in the Y-axis direction of the portion formed between the wall surfaces W2BL extending in the X-axis direction, among the wall surfaces of the non-overlapping portion D2L, is also substantially constant throughout positions in the X-axis direction.

Since the structure of the first embodiment includes the portion whose width in the Y-axis direction is substantially constant, as compared with a structure that does not include the portion whose width in the Y-axis direction is substantially constant, it is easier for a stream to go into the second portion U2 from the nozzle flow passage RN.

As illustrated in FIG. 5, in a plan view, the wall surface WU1 of the first portion U1 has a substantially circular shape.

Since the wall surface WU1 has a substantially circular shape in a plan view, as compared with a structure in which the wall surface WU1 has a vertex, the structure of the first embodiment makes the flow of ink smoother.

As illustrated in FIG. 5, in a plan view, each of the two wall surfaces W1A of the overlapping portion D1 has an arc shape.

Since each of the two wall surfaces W1A has an arc shape in a plan view, as compared with a structure in which at least one of the two wall surfaces W1A has a vertex, the structure of the first embodiment makes the flow of ink smoother.

The maximum width Wi2 of the second portion U2 in the X-axis direction is greater than the maximum width L2*a* of the second portion U2 in the Y-axis direction.

Since the maximum width Wi2 is greater than the maximum width L2*a*, the structure of the first embodiment makes the entry of ink from the nozzle flow passage RN into the second portion U2 easier.

The ratio of the maximum width L2*a* of the second portion U2 in the Y-axis direction to the maximum width Wi2 of the second portion U2 in the X-axis direction is less than 40%.

Since the liquid ejecting head 1 according to the first embodiment has the above structure, as compared with a structure in which the ratio of the maximum width L2*a* to the maximum width Wi2 is 40% or greater, the entry of ink from the nozzle flow passage RN into the second portion U2 is easier.

The width H2 of the second portion U2 in the +Z direction is greater than the width H1 of the first portion U1 in the +Z direction.

In the first embodiment, since the width H2 is greater than the width H1, the capacity of the second portion U2 is larger than the capacity of the first portion U1. This structure enhances the efficiency of supplying ink to the first portion U1. Moreover, since the width H1 is less than the width H2, the flow-passage resistance of the first portion U1 is smaller, resulting in higher ejection performance of the liquid ejecting head 1.

The liquid ejecting head 1 further includes the supply flow passage RX1, which is in communication with one end of the nozzle flow passage RN and through which ink is supplied to the nozzle flow passage RN, and the discharge flow passage RX2, which is in communication with the other end of the nozzle flow passage RN and through which ink is discharged from the nozzle flow passage RN.

Having the circulation mechanism 94, the structure of the first embodiment makes it possible to suppress the thickening of ink inside the liquid ejecting head 1.

The energy producing element is, for example, the piezoelectric element PZq. The liquid ejecting head 1 is capable of ejecting ink from the nozzle N by utilizing the energy produced by the piezoelectric element PZq.

The liquid ejecting apparatus 100 includes the liquid ejecting head 1 and the control unit 90. The control unit 90 controls the operation of ejection from the liquid ejecting head 1.

The first embodiment makes it possible to provide users with the liquid ejecting apparatus 100 capable of suppressing a decrease in ejection stability.

2. Second Embodiment

The second portion U2 according to the first embodiment has a hybrid shape obtained by, in a plan view, combining a substantial circle and a substantial rectangle at a position where the barycenter of the former and the barycenter of the latter overlap with each other. A second portion U2*a* according to a second embodiment has a hybrid shape obtained by, in a plan view, combining a substantial circle and a substantial rectangle at a position where the barycenter of the former and the barycenter of the latter overlap with each other, wherein the rectangular portion is widened at each of the two end regions in the X-axis direction to have a width in the Y-axis direction greater than that of the rectangular portion of the foregoing embodiment. The second embodiment will now be explained.

Figure 10:
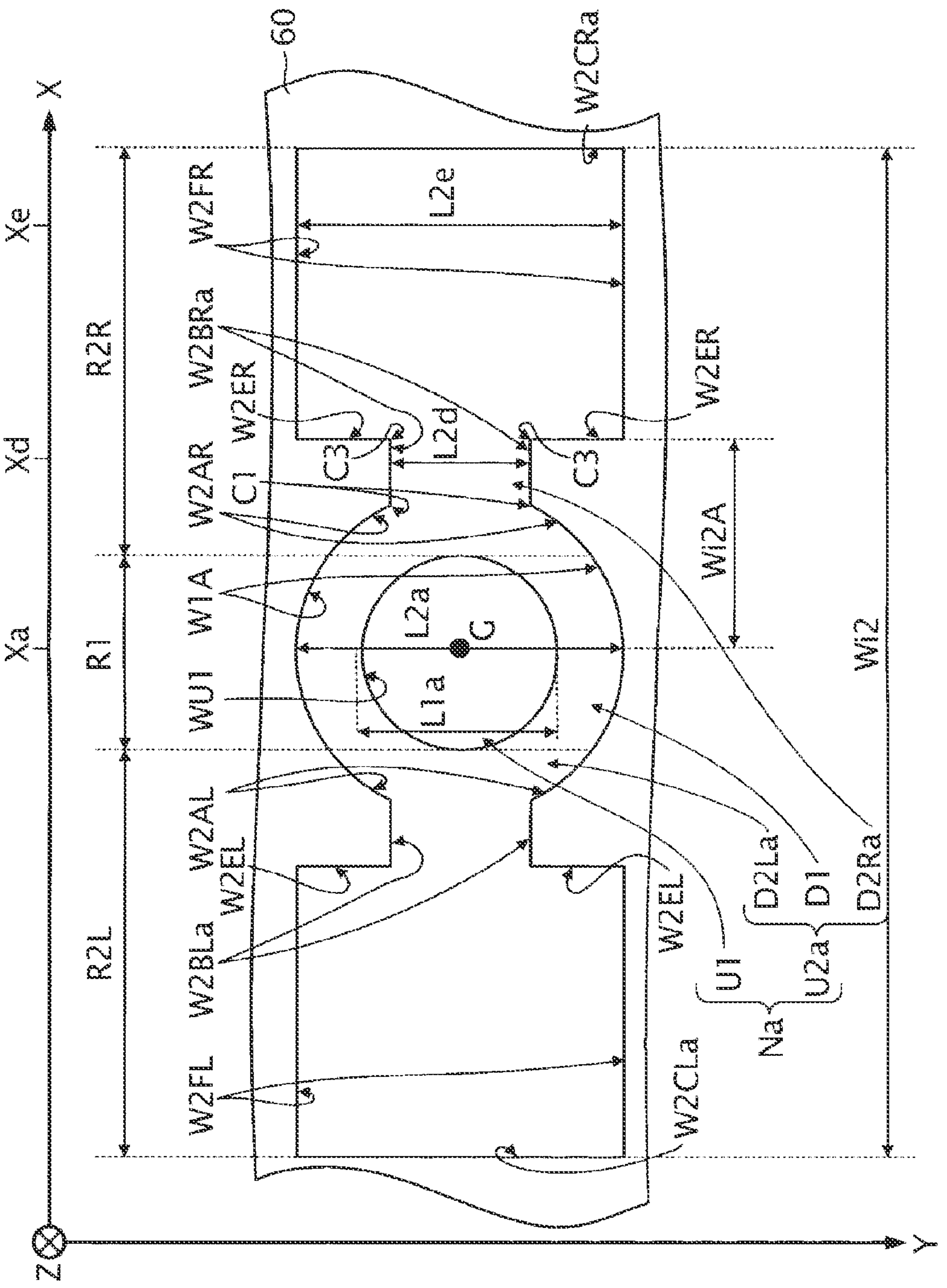
FIG. 10 is a plan view of a nozzle Na according to a second embodiment.

FIG. 10 is a plan view of a nozzle Na according to the second embodiment. The nozzle Na is different from the nozzle N in that it has the second portion U2*a* in place of the second portion U2. The second portion U2*a* is different from the second portion U2 in that it has a non-overlapping portion D2*a* in place of the non-overlapping portion D2. The non-overlapping portion D2*a* is a collective term for a non-overlapping portion D2La and a non-overlapping portion D2Ra.

The non-overlapping portion D2Ra is different from the non-overlapping portion D2R in that, in a plan view, it has two wall surfaces W2BRa in place of the two wall surfaces W2BR, a wall surface W2CRa in place of the wall surface W2CR, and two wall surfaces W2ER and two wall surfaces W2FR. The non-overlapping portion D2La is different from the non-overlapping portion D2L in that, in a plan view, it has two wall surfaces W2BLa in place of the two wall surfaces W2BL, a wall surface W2CLa in place of the wall surface W2CL, and two wall surfaces W2EL and two wall surfaces W2FL. The wall surfaces of the non-overlapping portion D2Ra will now be explained. The wall surfaces of the non-overlapping portion D2La are line-symmetrical to those of the non-overlapping portion D2Ra with respect to a virtual line going along the Y axis through the point G. Therefore, an explanation of the wall surfaces of the non-overlapping portion D2La is omitted.

As illustrated in FIG. 10, in a plan view, each of the two wall surfaces W2BRa is connected at its −X-side end to either one of the two wall surfaces W2AR and extends in the X-axis direction. Each of the two wall surfaces W2ER is connected to either one of the two wall surfaces W2BRa and extends in the Y-axis direction. More particularly, the one, of the two wall surfaces W2ER, located on the −Y side is connected at its +Y-side end to the one, of the two wall surfaces W2BRa, located on the −Y side. The other, of the two wall surfaces W2ER, located on the +Y side is connected at its −Y-side end to the other, of the two wall surfaces W2BRa, located on the +Y side. Two corners C3 are formed by connection between the wall surface W2BRa located on the −Y side and the wall surface W2ER located on the −Y side and connection between the wall surface W2BRa located on the +Y side and the wall surface W2ER located on the +Y side. Each of the two wall surfaces W2FR is connected at its −X-side end to either one of the two wall surfaces W2ER and extends in the X-axis direction. The wall surface W2CRa is connected at its respective Y-directional ends to the two wall surfaces W2FR and extends in the Y-axis direction.

As illustrated in FIG. 10, the width L2*d* in the Y-axis direction of the portion that is a part of the non-overlapping portion D2Ra and is located at a position Xd in the X-axis direction is less than the width L2*e* in the Y-axis direction of the portion that is a part of the non-overlapping portion D2Ra and is located at a position Xe in the X-axis direction. The position Xe is farther from the first region R1 than the position Xd is. The Xd-positional portion in the X-axis direction is included in the portion formed between the two wall surfaces W2BRa. The Xe-positional portion in the X-axis direction is included in the portion formed between the two wall surfaces W2FR.

The position Xd is an example of "first position". The position Xe is an example of "second position". The position, in the non-overlapping portion D2La, line-symmetrical to the position Xd with respect to a virtual line going along the Y axis through the point G may be an example of "first position". The position, in the non-overlapping portion D2La, line-symmetrical to the position Xe with respect to a virtual line going along the Y axis through the point G may be an example of "second position".

An example of the dimensions of the nozzle Na according to the second embodiment will now be described. The length of the wall surface W2CRa in the Y-axis direction is the width L2*e*, which is substantially the same as the maximum width L2*a*. The width Wi2A from the position Xa to the wall surface W2ER in the X-axis direction is approximately 25 μm. Therefore, the width from the wall surface W2EL to the wall surface W2ER in the X-axis direction is approximately 50 μm.

2.1. Summary of Second Embodiment

As described above, in the second embodiment, the width L2*d* in the Y-axis direction of the portion that is a part of the non-overlapping portion D2Ra and is located at the position Xd in the X-axis direction is less than the width L2*e* in the Y-axis direction of the portion that is a part of the non-overlapping portion D2Ra and is located at the position Xe in the X-axis direction. The position Xe is farther from the first region R1 than the position Xd is.

The vortex flow illustrated in FIG. 7 occurs in the neighborhood of the first region R1. Therefore, by configuring such that the width L2*d* in the Y-axis direction of the portion located at the position Xd, which is closer to the first region R1 than the position Xe is, is less than the width L2*e* in the Y-axis direction of the portion located at the position Xe, it is possible to suppress the occurrence of a vortex flow. Moreover, since the width L2*e* is greater than the width L2*d*, as compared with the first embodiment, it is easier for a stream to go into the second portion U2*a* from the nozzle flow passage RN. The entry of ink from the nozzle flow passage RN into the second portion U2*a* will now be explained with reference to FIG. 11.

Figure 11:
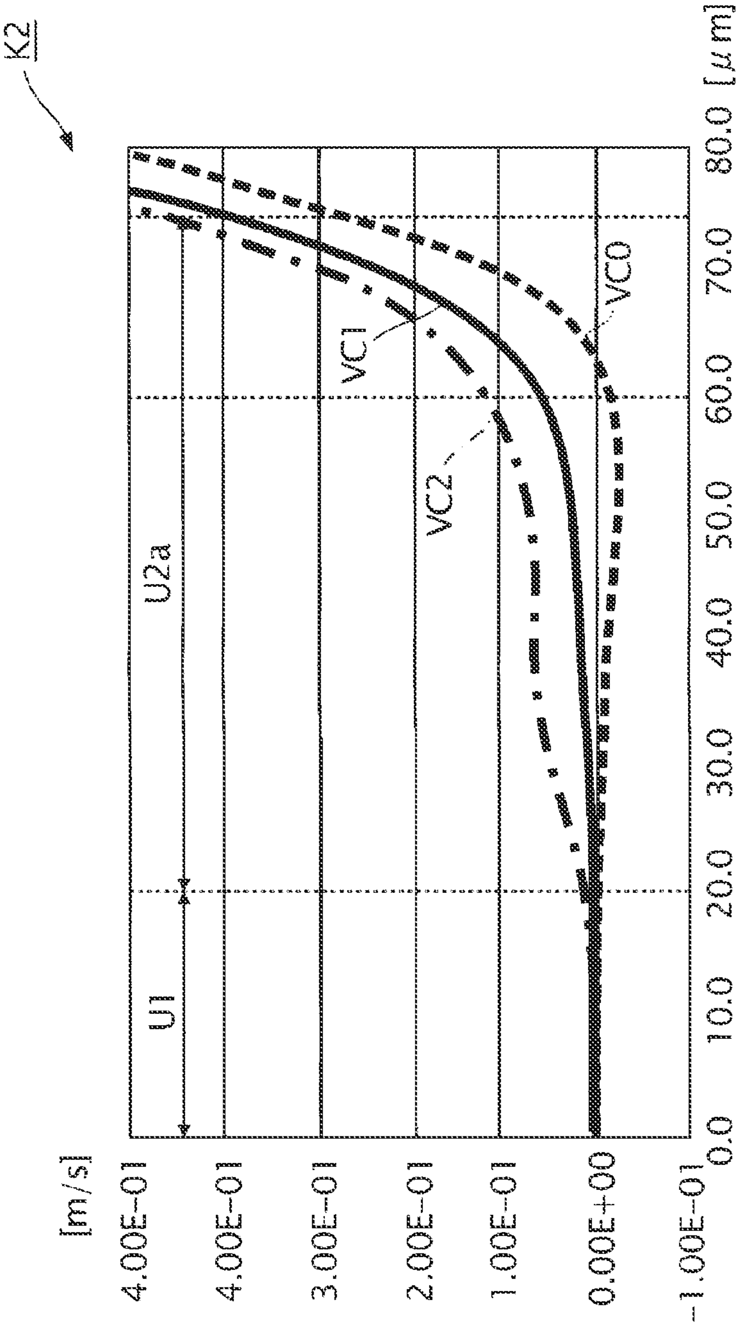
FIG. 11 is a diagram for explaining the entry of ink from the nozzle flow passage RN into a second portion U2*a*.

FIG. 11 is a diagram for explaining the entry of ink from the nozzle flow passage RN into the second portion U2*a*. FIG. 11 additionally illustrates, in the area K2 of the graph K1, flow velocity characteristics VC2 according to the second embodiment. As shown by the flow velocity characteristics VC2 and the flow velocity characteristics VC1, throughout the entire area of the second portion U2*a*, flow velocity at the second portion U2*a* according to the second embodiment is higher than flow velocity at the second portion U2 according to the first embodiment. For example, at the position of approximately 60 in the −Z direction from the +Z-side surface of the nozzle substrate 60, flow velocity according to the second embodiment is approximately $1.1\times10^{-1}$ m/s as shown by the flow velocity characteristics VC2, whereas flow velocity according to the first embodiment is approximately $6.0\times10^{-2}$ m/s as shown by the flow velocity characteristics VC1. The higher the flow velocity is, the greater the entry from the nozzle flow passage RN into the second portion U2*a* is. Therefore, as compared with the first embodiment, the second embodiment makes the entry from the nozzle flow passage RN into the second portion U2*a* greater, thereby making it easier to stir the thickened ink inside the second portion U2*a*.

3. Third Embodiment

A non-overlapping portion D2Rb included in a second portion U2*b* according to a third embodiment is different from the non-overlapping portion D2R according to the first embodiment in that the two corners C1 thereof are eliminated. The third embodiment will now be explained.

Figure 12:
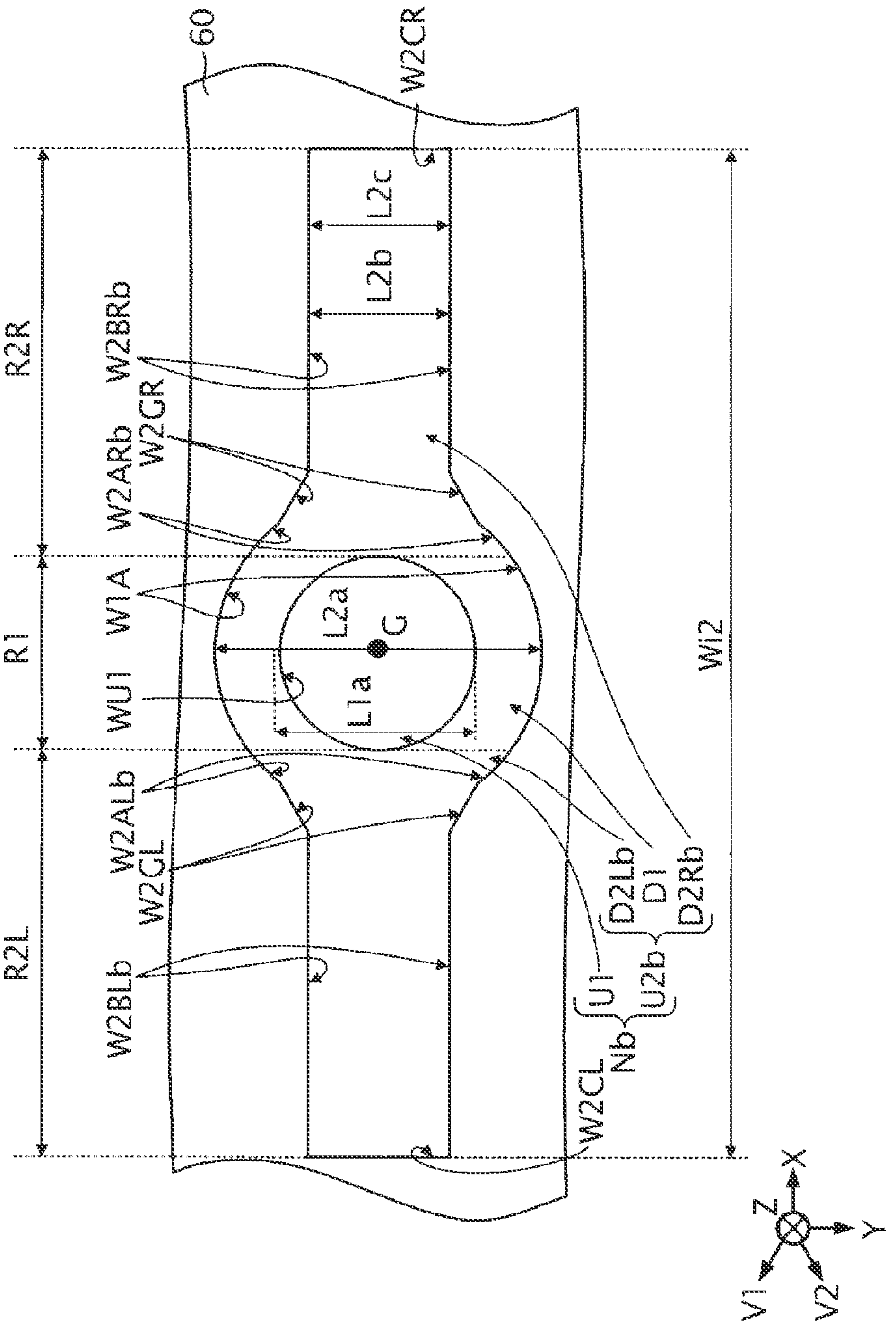
FIG. 12 is a plan view of a nozzle Nb according to a third embodiment.

FIG. 12 is a plan view of a nozzle Nb according to the third embodiment. The nozzle Nb is different from the nozzle N in that it has the second portion U2*b* in place of the second portion U2. The second portion U2*b* is different from the second portion U2 in that it has a non-overlapping portion D2*b* in place of the non-overlapping portion D2. The non-overlapping portion D2*b* is a collective term for a non-overlapping portion D2Lb and the non-overlapping portion D2Rb.

The non-overlapping portion D2Rb is different from the non-overlapping portion D2R in that, in a plan view, it has two wall surfaces W2ARb in place of the two wall surfaces W2AR, two wall surfaces W2BRb in place of the two wall surfaces W2BR, and two wall surfaces W2GR and does not have the two corners C1. The non-overlapping portion D2Lb is different from the non-overlapping portion D2L in that it has two wall surfaces W2ALb in place of the two wall surfaces W2AL, two wall surfaces W2BLb in place of the two wall surfaces W2BL, and two wall surfaces W2GL. In a plan view, the wall surfaces of the non-overlapping portion D2Lb are line-symmetrical to those of the non-overlapping portion D2Rb with respect to a virtual line going along the Y axis through the point G. Therefore, an explanation of the wall surfaces of the non-overlapping portion D2Lb is omitted.

As illustrated in FIG. 12, in a plan view, each of the two wall surfaces W2ARb is connected to either one of the two wall surfaces W1A and has an arc shape centering at the point G. As illustrated in FIG. 12, in a plan view, each of the two wall surfaces W2GR is connected to either one of the two wall surfaces W2ARb and extends in a direction intersecting with the X-axis direction and the Y-axis direction. Specifically, the one, of the two wall surfaces W2GR, located on the −Y side extends in a V1 direction, and the other W2GR located on the +Y side extends in a V2 direction. Each of the two wall surfaces W2BRb is connected to either one of the two wall surfaces W2GR and extends in the X-axis direction.

Each of the two wall surfaces W2ARb is an example of "first wall surface". When the one, of the two wall surfaces W2ARb, located on the −Y side corresponds to "first wall surface", the one, of the two wall surfaces W2GR, located on the −Y side corresponds to "second wall surface", and the one, of the two wall surfaces W2BRb, located on the −Y side corresponds to "third wall surface". When the one, of the two wall surfaces W2ARb, located on the +Y side corresponds to "first wall surface", the one, of the two wall surfaces W2GR, located on the +Y side corresponds to "second wall surface", and the one, of the two wall surfaces W2BRb, located on the +Y side corresponds to "third wall surface".

Each of the two wall surfaces W2ALb may be an example of "first wall surface". When the one, of the two wall surfaces W2ALb, located on the −Y side corresponds to "first wall surface", the one, of the two wall surfaces W2GL, located on the −Y side corresponds to "second wall surface", and the one, of the two wall surfaces W2BLb, located on the −Y side corresponds to "third wall surface". When the one, of the two wall surfaces W2ALb, located on the +Y side corresponds to "first wall surface", the one, of the two wall surfaces W2GL, located on the +Y side corresponds to "second wall surface", and the one, of the two wall surfaces W2BLb, located on the +Y side corresponds to "third wall surface".

As explained above, the non-overlapping portion D2Rb according to the third embodiment includes, as viewed in the +Z direction, the two wall surfaces W2ARb, each of which is connected to either one of the two wall surfaces W1A of the overlapping portion D1 and has an arc shape, the two wall surfaces W2GR, each of which is connected to either one of the two wall surfaces W2ARb and extends in the V1 direction or the V2 direction each intersecting with the X-axis direction and the Y-axis direction, and the two wall surfaces W2BRb, each of which is connected to either one of the two wall surfaces W2GR and extends in the X-axis direction.

The corner C1 of the non-overlapping portion D2 according to the first embodiment is prone to chipping during the manufacturing of the liquid ejecting head 1. Therefore, there is a risk that the shape of the non-overlapping portion D2 might change. If the shape of the non-overlapping portion D2 changes, ejection performance, that is, either one, or both, of the amount of ink ejected from the nozzle N and the velocity of ink ejected from the nozzle N, might decrease.

In the third embodiment, the corners C1 are eliminated by providing the wall surfaces W2GR. Since the non-overlapping portion D2Rb does not have the corners C1, it is possible to prevent the shape of the non-overlapping portion D2Rb from changing during the manufacturing of the liquid ejecting head 1.

4. Fourth Embodiment

A second portion U2*c* according to a fourth embodiment is different from the second portion U2 according to the first embodiment in that it does not have the corner C2 as viewed in the Y-axis direction. The fourth embodiment will now be explained.

Figure 13:
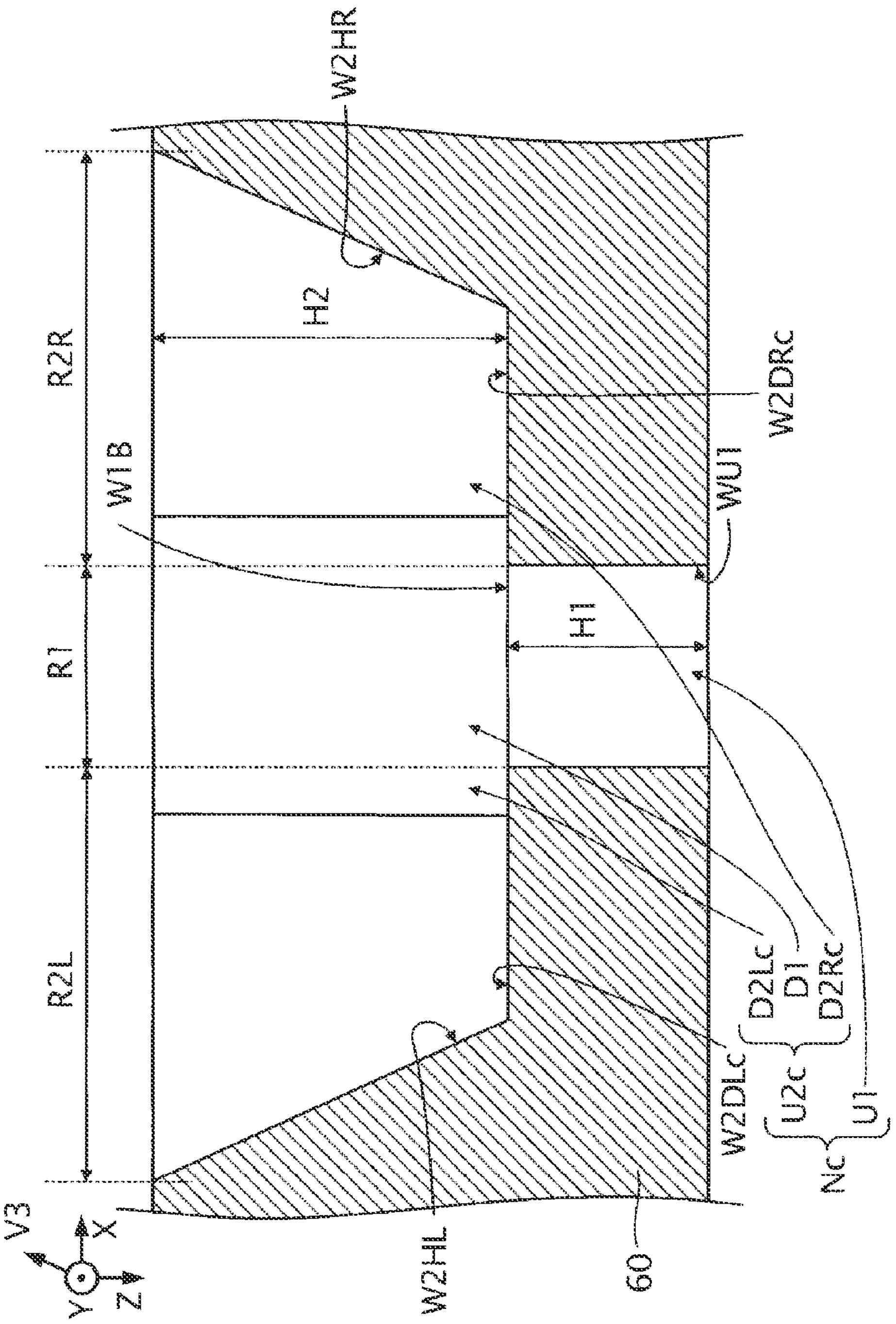
FIG. 13 is a diagram for explaining a nozzle Nc according to a fourth embodiment.

FIG. 13 is a diagram for explaining a nozzle Nc according to the fourth embodiment. Specifically, FIG. 13 depicts a cross section of the nozzle substrate 60 taken in parallel with an X-Z plane in such a way as to go across the nozzle Nc. The nozzle Nc is different from the nozzle N in that it has the second portion U2*c* in place of the second portion U2. The second portion U2*c* is different from the second portion U2 in that it has a non-overlapping portion D2*c* in place of the non-overlapping portion D2. The non-overlapping portion D2*c* is a collective term for a non-overlapping portion D2Lc and a non-overlapping portion D2Rc.

The non-overlapping portion D2Rc is different from the non-overlapping portion D2R in that it has a wall surface W2DRc in place of the wall surface W2DR, does not have the wall surface W2CR, and has a wall surface W2HR as viewed in the +Y direction. The non-overlapping portion D2Lc is different from the non-overlapping portion D2L in that it has a wall surface W2DLc in place of the wall surface W2DL, does not have the wall surface W2CL, and has a wall surface W2HL as viewed in the +Y direction. The wall surfaces of the non-overlapping portion D2Rc will now be explained. As viewed in the +Y direction, the wall surfaces of the non-overlapping portion D2Lc are line-symmetrical to those of the non-overlapping portion D2Rc with respect to the central axis of the first portion U1. Therefore, an explanation of the wall surfaces of the non-overlapping portion D2Lc is omitted.

The wall surface W2DRc is a surface extending along an X-Y plane. As viewed in the +Y direction, the wall surface W2DRc is connected at its −X-side end to the wall surface WU1 and the wall surface W1B. The wall surface W2HR is connected at its −X-side end to the wall surface W2DRc and extends in a V3 direction, which intersects with the X-axis direction and the Z-axis direction.

In the fourth embodiment, the wall surface W2DRc is an example of "fourth wall surface", and the wall surface W2HR is an example of "fifth wall surface". The wall surface W2DLc may be an example of "fourth wall surface". The wall surface W2HL may be an example of "fifth wall surface".

As explained above, as viewed in the Y-axis direction, the non-overlapping portion D2Rc includes the wall surface W2DRc, which extends the X-axis direction, and the wall surface W2HR, which is connected to the wall surface W2DRc and extends in the V3 direction intersecting with the X-axis direction and the Z-axis direction.

In the fourth embodiment, the corner C2 is eliminated by providing the wall surface W2HR. Since the non-overlapping portion D2Rc does not have the corner C2, it is possible to reduce a space where ink could stagnate. Therefore, it is possible to reduce the stay of thickened ink.

5. Fifth Embodiment

One of the differences of a non-overlapping portion D2Rd according to a fifth embodiment from the non-overlapping portion D2Rc according to the fourth embodiment lies in that it has a wall surface W2CRd extending in the Z-axis direction as viewed in the Y-axis direction. The fifth embodiment will now be explained.

Figure 14:
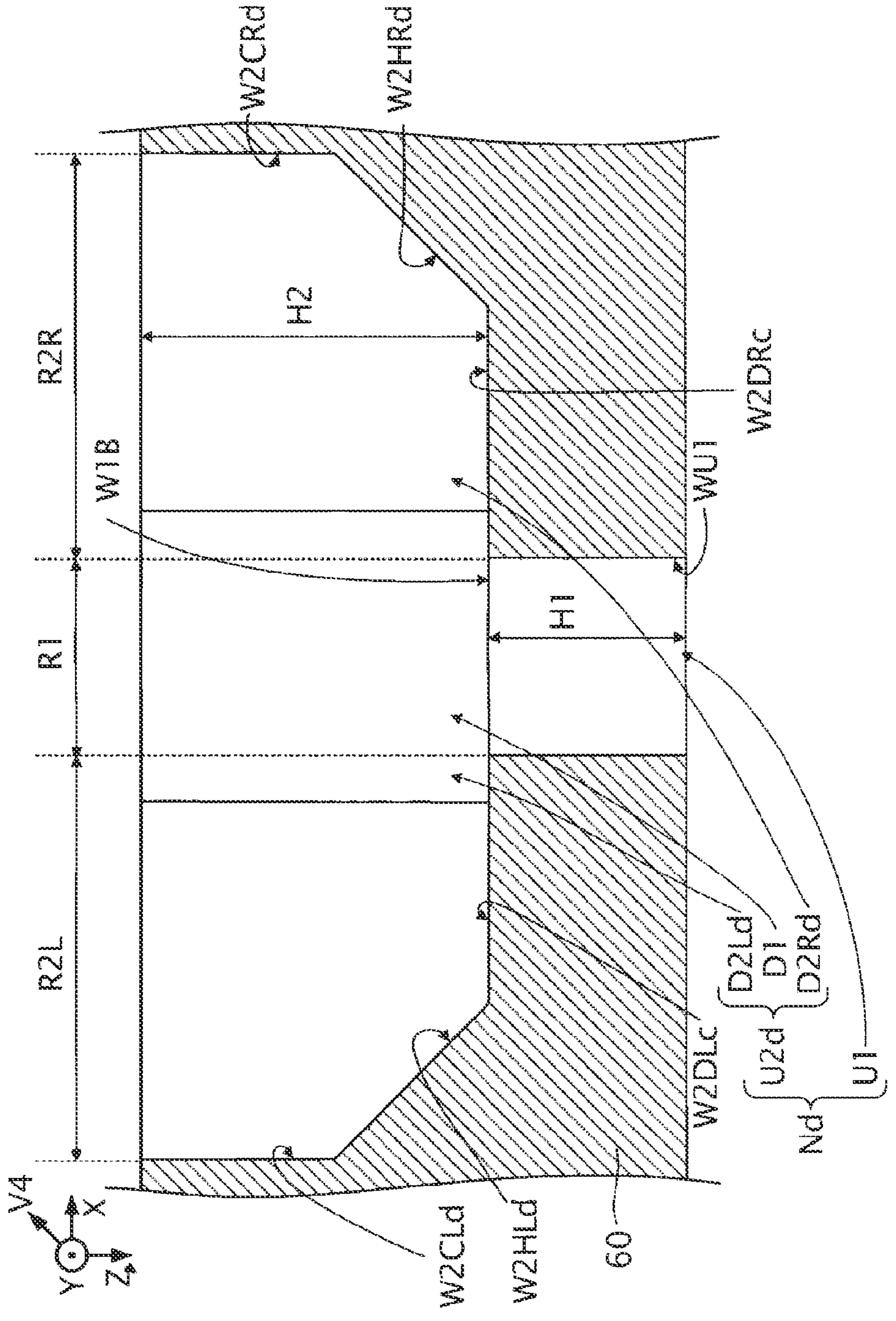
FIG. 14 is a diagram for explaining a nozzle Nd according to a fifth embodiment.

FIG. 14 is a diagram for explaining a nozzle Nd according to the fifth embodiment. Specifically, FIG. 14 depicts a cross section of the nozzle substrate 60 taken in parallel with an X-Z plane in such a way as to go across the nozzle Nd. The nozzle Nd is different from the nozzle Nc according to the fourth embodiment in that it has a second portion U2*d* in place of the second portion U2*c*. The second portion U2*d* is different from the second portion U2*c* in that it has a non-overlapping portion D2*d* in place of the non-overlapping portion D2*c*. The non-overlapping portion D2*d* is a collective term for a non-overlapping portion D2Ld and the non-overlapping portion D2Rd.

The non-overlapping portion D2Rd is different from the non-overlapping portion D2Rc in that it has a wall surface W2HRd in place of the wall surface W2HR, and has the wall surface W2CRd, as viewed in the +Y direction. The non-overlapping portion D2Ld is different from the non-overlapping portion D2Lc in that it has a wall surface W2HLd in place of the wall surface W2HL, and has a wall surface W2CLd. The wall surfaces of the non-overlapping portion D2Rd will now be explained. As viewed in the +Y direction, the wall surfaces of the non-overlapping portion D2Ld are line-symmetrical to those of the non-overlapping portion D2Rd with respect to the central axis of the first portion U1. Therefore, an explanation of the wall surfaces of the non-overlapping portion D2Ld is omitted.

The wall surface W2HRd is connected at its −X-side end to the wall surface W2DRc and extends in a V4 direction, which intersects with the X-axis direction and the Z-axis direction. The wall surface W2CRd is connected at its +Z-side end to the wall surface W2HRd and extends in the Z-axis direction.

In the fifth embodiment, the wall surface W2DRc is an example of "fourth wall surface", and the wall surface W2HRd is an example of "fifth wall surface". The wall surface W2DLc may be an example of "fourth wall surface". The wall surface W2HLd may be an example of "fifth wall surface".

As explained above, as viewed in the Y-axis direction, the non-overlapping portion D2Rd includes the wall surface W2DRc, which extends the X-axis direction, and the wall surface W2HRd, which is connected to the wall surface W2DRc and extends in the V4 direction intersecting with the X-axis direction and the Z-axis direction.

In the fifth embodiment, similarly to the fourth embodiment, the corner C2 is eliminated by providing the wall surface W2HRd. Since the non-overlapping portion D2Rd does not have the corner C2, it is possible to reduce a space where ink could stagnate. Therefore, it is possible to reduce the stay of thickened ink.

6. Modification Example

The embodiments described as examples above can be modified in various ways. Some specific examples of modification are described below. Two or more modification examples selected arbitrarily from the description below may be combined as long as they are not contradictory to each other or one another.

6.1. First Modification Example

In the first to fifth embodiments, the width of the first portion U1 in the Y-axis direction is greater than the width of the non-overlapping portion D2 in the Y-axis direction. However, the scope of the present disclosure is not limited to this structure. For example, the width of the first portion U1 in the Y-axis direction may be less than the width of the non-overlapping portion D2 in the Y-axis direction. The width of the first portion U1 in the Y-axis direction is, for example, the maximum width L1*a* of the first portion U1 in the Y-axis direction. The width of the non-overlapping portion D2 in the Y-axis direction is, for example, the width L2*b* of the rectangular portion included in the non-overlapping portion D2 in the Y-axis direction.

In general, the smaller the cross-sectional area size of a flow passage is, the higher the velocity of flow through the flow passage is. As compared with a structure in which the width of the first portion U1 in the Y-axis direction is greater than the width of the non-overlapping portion D2 in the Y-axis direction, if the width of the first portion U1 in the Y-axis direction is less than the width of the non-overlapping portion D2 in the Y-axis direction, ink flows faster inside the first portion U1. The increased velocity of flow makes the velocity of ejection from the nozzle N higher.

6.2. Second Modification Example

In the first to fifth embodiments and the first modification example, the width of the second portion U2 in the +Z direction is greater than the width of the first portion U1 in the +Z direction. However, the width of the second portion U2 in the +Z direction may be less than the width of the first portion U1 in the +Z direction.

If the width of the second portion U2 in the +Z direction is less than the width of the first portion U1 in the +Z direction, as compared with the first embodiment, it is possible to make the entry of ink into the first portion U1 easier.

6.3. Third Modification Example

In each of the foregoing embodiments, the ratio of the width of the non-overlapping portion D2 in the Y-axis direction to the width of the overlapping portion D1 in the Y-axis direction is 20% or greater and 50% or less. However, the scope of the present disclosure is not limited to this structure. It is sufficient as long as the width of the overlapping portion D1 in the Y-axis direction is greater than the width of the non-overlapping portion D2 in the Y-axis direction. Therefore, for example, the ratio of the width of the non-overlapping portion D2 in the Y-axis direction to the width of the overlapping portion D1 in the Y-axis direction may be less than 20%, or greater than 50%.

6.4. Fourth Modification Example

In each of the foregoing embodiments, the ratio of the width of the first portion U1 in the Y-axis direction to the width of the overlapping portion D1 in the Y-axis direction is 20% or greater and 60% or less. However, the scope of the present disclosure is not limited to this structure. For example, the ratio of the width of the first portion U1 in the Y-axis direction to the width of the overlapping portion D1 in the Y-axis direction may be less than 20%, or greater than 60%.

6.5. Fifth Modification Example

In each of the foregoing embodiments, the wall surface W1A of the overlapping portion D1 has an arc shape as viewed in the +Z direction. However, the scope of the present disclosure is not limited to this structure. For example, the wall surface W1A may be curved elliptically as viewed in the +Z direction. Similarly, the wall surface WU1 of the first portion U1 does not necessarily have to have a substantially circular shape.

Figure 15:
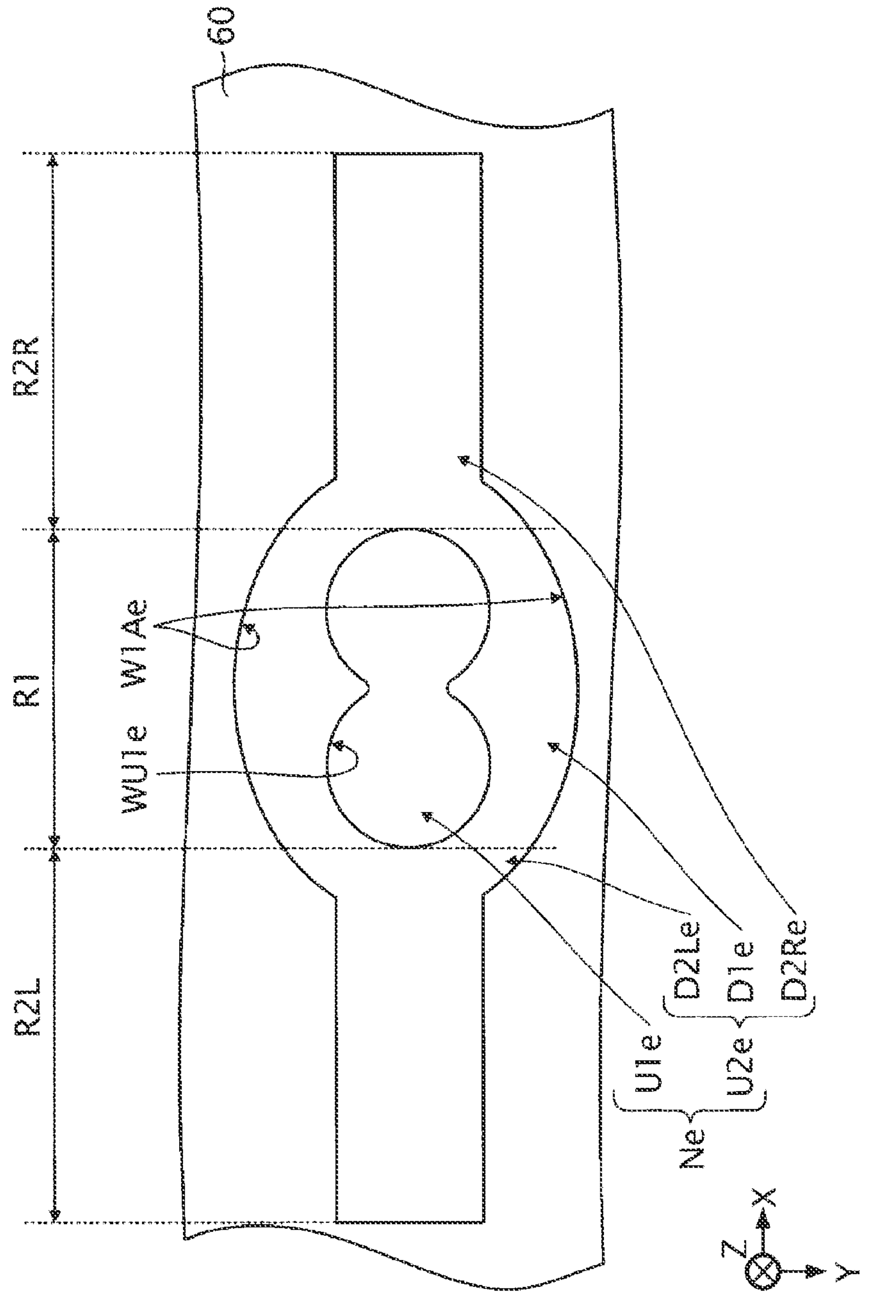
FIG. 15 is a plan view of a nozzle Ne according to a fifth modification example.

FIG. 15 is a plan view of a nozzle Ne according to a fifth modification example. The nozzle Ne is different from the nozzle N in that it has a first portion U1*e* in place of the first portion U1 and has a second portion U2*e* in place of the second portion U2. The first portion U1*e* has a shape obtained by combining two circles in a plan view, with their centers shifted from each other in the X-axis direction. The second portion U2*e* has a hybrid shape obtained by combining an ellipse and a rectangle at a position where the barycenter of the former and the barycenter of the latter overlap with each other.

As illustrated in FIG. 15, the first portion U1*e* has a wall surface WU1*e*. As illustrated in FIG. 15, the wall surface WU1*e* has a shape obtained by combining two circles in a plan view, with their centers shifted from each other in the X-axis direction.

As illustrated in FIG. 15, the second portion U2*e* has an overlapping portion D1*e* and a non-overlapping portion D2*e*. The non-overlapping portion D2*e* is a collective term for a non-overlapping portion D2Le and a non-overlapping portion D2Re. As illustrated in FIG. 15, the overlapping portion D1*e* has two wall surfaces W1Ae. In a plan view, each of the two wall surfaces W1Ae has an elliptical arc shape.

6.6. Sixth Modification Example

In each of the foregoing embodiments, the width of the overlapping portion D1 in the Y-axis direction throughout positions in the X-axis direction increases gradually from the both-end portion of the overlapping portion D1 toward the central portion of the overlapping portion D1. However, the scope of the present disclosure is not limited to this structure. For example, the width of the overlapping portion D1 in the Y-axis direction throughout positions in the X-axis direction may be constant.

Figure 16:
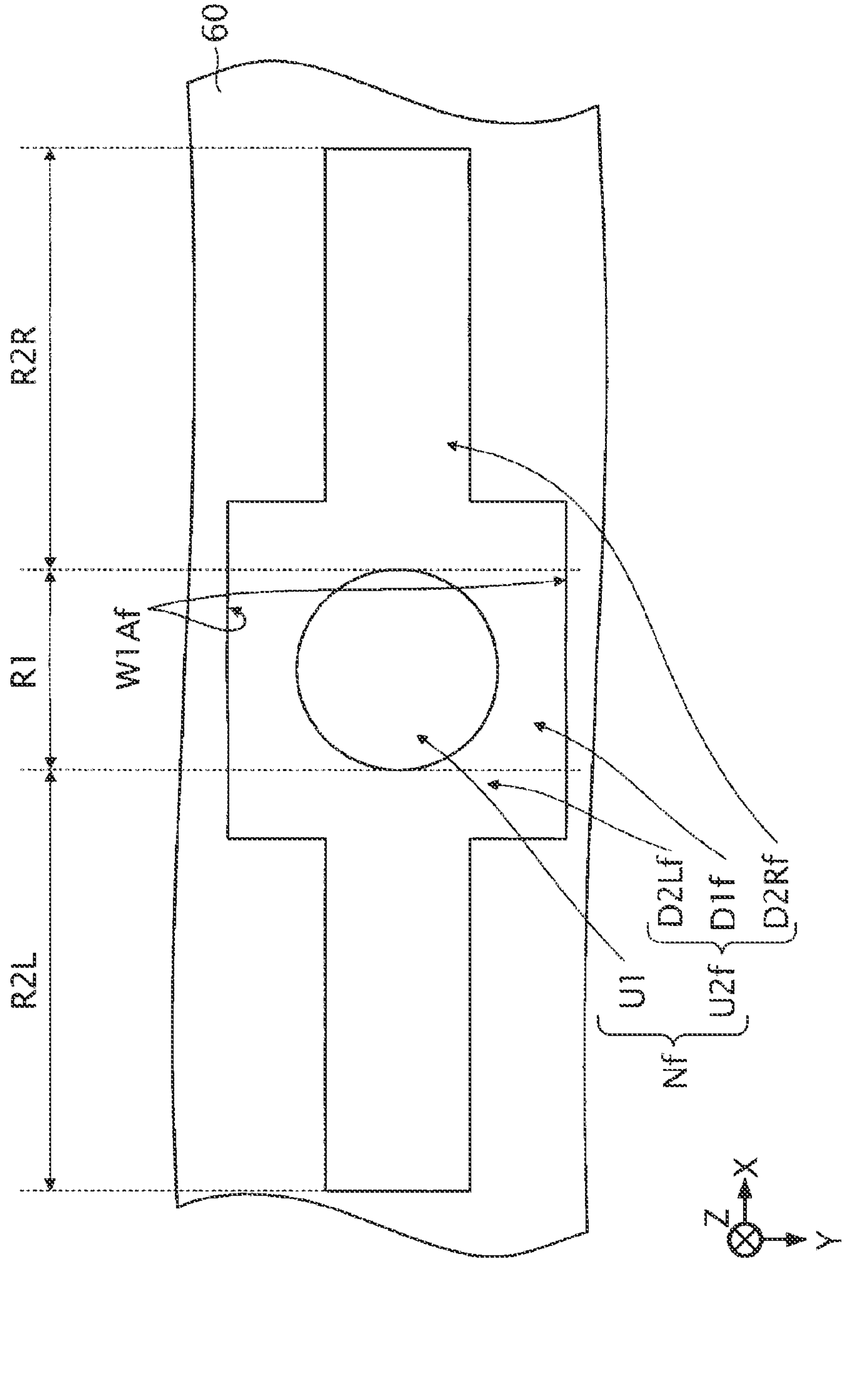
FIG. 16 is a plan view of a nozzle Nf according to a sixth modification example.

FIG. 16 is a plan view of a nozzle Nf according to a sixth modification example. The nozzle Nf is different from the nozzle N in that it has a second portion U2*f* in place of the second portion U2. The second portion U2*f* has a hybrid shape obtained by combining a square and a rectangle at a position where the barycenter of the former and the barycenter of the latter overlap with each other.

As illustrated in FIG. 16, the second portion U2*f* has an overlapping portion D1*f* and a non-overlapping portion D2*f*. The non-overlapping portion D2*f* is a collective term for a non-overlapping portion D2Lf and a non-overlapping portion D2Rf. As illustrated in FIG. 16, the overlapping portion D1*f* has two wall surfaces W1Af. In a plan view, the two wall surfaces W1Af extend in the X-axis direction. Therefore, the width of the overlapping portion D1*f* in the Y-axis direction throughout positions in the X-axis direction is constant.

6.7. Seventh Modification Example

In the first embodiment, the width in the Y-axis direction of the portion formed between the wall surfaces W2BR extending in the X-axis direction, among the wall surfaces of the non-overlapping portion D2R, is substantially constant throughout positions in the X-axis direction. However, the scope of the present disclosure is not limited to this structure. For example, the width in the Y-axis direction of the portion formed between the wall surfaces W2BR may increase as it goes farther from the overlapping portion D1 in the X-axis direction.

6.8. Eighth Modification Example

Though it has been described that the ratio of the maximum width L2*a* of the second portion U2 in the Y-axis direction to the maximum width Wi2 of the second portion U2 in the X-axis direction is less than 40%, the scope of the present disclosure is not limited thereto. This ratio may be 40% or greater.

6.9. Ninth Modification Example

The non-overlapping portion D2Rb according to the third embodiment has a shape obtained by eliminating the two corners C1 of the non-overlapping portion D2R. However, the two corners C1 of the non-overlapping portion D2*a* according to the second embodiment may be eliminated instead. The two corners C2 of the non-overlapping portion D2*a* may be eliminated.

6.10. Tenth Modification Example

In each of the foregoing embodiments, the second portion U2 has a line-symmetrical shape with respect to a virtual line going along the Y axis through the point G. However, the scope of the present disclosure is not limited to this structure. For example, the second portion U2 may have a hybrid shape obtained by, in a plan view, combining a substantial circle and a substantial rectangle at a position where the center of the former and the center of the latter are shifted from each other in the X-axis direction.

6.11. Eleventh Modification Example

The liquid ejecting apparatus 100 according to each of the foregoing embodiments includes the circulation mechanism 94. However, the circulation mechanism 94 may be omitted. The liquid ejecting apparatus 100, if not equipped with the circulation mechanism 94, does not have to have the discharge flow passage RX2, the discharge flow passage RA2, and the discharge flow passage RB2.

6.12. Twelfth Modification Example

In each of the foregoing embodiments, the piezoelectric element PZq has been described as an example of an energy producing element. However, the energy producing element is not limited to the piezoelectric element PZq. For example, the energy producing element may be a heat generation element that converts electric energy into thermal energy and generates air bubbles inside the pressure compartment CB by heating to cause changes in pressure inside the pressure compartment CB.

6.13. Thirteenth Modification Example

In each of the foregoing embodiments, a so-called serial-type liquid ejecting apparatus configured to reciprocate the housing case 921, in which the liquid ejecting heads 1 are housed, has been described to show some examples. However, the present disclosure may be applied to a so-called line-type liquid ejecting apparatus in which the plural nozzles N are arranged throughout the entire width of the medium PP.

6.14. Fourteenth Modification Example

The liquid ejecting apparatus 100 disclosed as examples in the foregoing embodiments can be applied to not only print-only machines but also various kinds of equipment such as facsimiles and copiers, etc. The scope of application and use of the liquid ejecting apparatus according to the present disclosure is not limited to printing. For example, a liquid ejecting apparatus that ejects a colorant solution can be used as an apparatus for manufacturing a color filter of a display device such as a liquid crystal display panel. A liquid ejecting apparatus that ejects a solution of a conductive material can be used as a manufacturing apparatus for forming wiring lines and electrodes of a wiring substrate. A liquid ejecting apparatus that ejects a solution of a living organic material can be used as a manufacturing apparatus for, for example, production of biochips.

What is claimed is:

1. A liquid ejecting head, comprising:
   - a flow passage through which a liquid flows;
   - an energy producing element that produces energy for ejecting the liquid; and
   - a nozzle which is in communication with the flow passage and from which the liquid is ejected by utilizing the energy produced by the energy producing element; wherein
   - a direction in which a portion which is a part of the flow passage and with which the nozzle is in communication extends is defined as a first direction, a direction in which the liquid is ejected from the nozzle and which is orthogonal to the first direction is defined as a second direction, and a direction which is orthogonal to both the first direction and the second direction is defined as a third direction, given above definition, the nozzle includes a first portion and a second portion, the second portion being located closer to the flow passage along the second direction than the first portion is, cross-sectional area size of the first portion when viewed in the second direction is smaller than cross-sectional area size of the second portion when viewed in the second direction, a width, in the third direction, of an overlapping portion that is a part of the second portion and is included in a first region is greater than a width, in the third direction, of a non-overlapping portion that is a part of the second portion and is included in a second region, the first region is a region where the second portion overlaps with the first portion in the first direction, the second region is a region where the second portion does not overlap with the first portion in the first direction, and a maximum width of the second portion in the first direction is greater than a maximum width of the second portion in the third direction.

2. The liquid ejecting head according to claim 1, wherein a ratio of the width of the non-overlapping portion in the third direction to the width of the overlapping portion in the third direction is 20% or greater and 50% or less.

3. The liquid ejecting head according to claim 1, wherein the width of the overlapping portion in the third direction is greater than a width of the first portion in the third direction.

4. The liquid ejecting head according to claim 3, wherein a ratio of the width of the first portion in the third direction to the width of the overlapping portion in the third direction is 20% or greater and 60% or less.

5. The liquid ejecting head according to claim 3, wherein the width of the first portion in the third direction is greater than the width of the non-overlapping portion in the third direction.

6. The liquid ejecting head according to claim 3, wherein the width of the first portion in the third direction is less than the width of the non-overlapping portion in the third direction.

7. The liquid ejecting head according to claim 1, wherein the width of the overlapping portion in the third direction throughout positions in the first direction increases gradually from a both-end portion of the overlapping portion toward a central portion of the overlapping portion.

8. The liquid ejecting head according to claim 1, wherein a width, in the third direction, of a portion formed between wall surfaces extending in the first direction, among wall surfaces of the non-overlapping portion, is substantially constant throughout positions in the first direction.

9. The liquid ejecting head according to claim 1, wherein a width, in the third direction, of a portion that is a part of the non-overlapping portion and is located at a first position in the first direction is less than a width, in the third direction, of a portion that is a part of the non-overlapping portion and is located at a second position in the first direction, the second position being farther from the first region than the first position is.

10. The liquid ejecting head according to claim 1, wherein a wall surface of the first portion has a substantially circular shape as viewed in the second direction.

11. The liquid ejecting head according to claim 1, wherein a wall surface of the overlapping portion has an arc shape.

12. The liquid ejecting head according to claim 11, wherein a ratio of a maximum width of the second portion in the third direction to a maximum width of the second portion in the first direction is less than 40%.

13. The liquid ejecting head according to claim 1, wherein a width of the second portion in the second direction is greater than a width of the first portion in the second direction.

14. The liquid ejecting head according to claim 1, wherein a width of the second portion in the second direction is less than a width of the first portion in the second direction.

15. The liquid ejecting head according to claim 1, wherein the non-overlapping portion includes, as viewed in the second direction, a first wall surface connected to a wall surface of the overlapping portion and having an arc shape, a second wall surface connected to the first wall surface and extending in a direction intersecting with the first direction and the third direction, and a third wall surface connected to the second wall surface and extending in the first direction.

16. The liquid ejecting head according to claim 1, wherein the non-overlapping portion includes, as viewed in the third direction, a fourth wall surface extending in the first direction and a fifth wall surface connected to the fourth wall surface and extending in a direction intersecting with the first direction and the second direction.

17. The liquid ejecting head according to claim 1, further comprising:

a supply flow passage which is in communication with one end of the flow passage and through which the liquid is supplied to the flow passage; and a discharge flow passage which is in communication with an other end of the flow passage and through which the liquid is discharged from the flow passage.

18. The liquid ejecting head according to claim 1, wherein the energy producing element is a piezoelectric element.

19. A liquid ejecting head, comprising:

a flow passage through which a liquid flows;

an energy producing element that produces energy for ejecting the liquid; and a nozzle which is in communication with the flow passage and from which the liquid is ejected by utilizing the energy produced by the energy producing element; wherein a direction in which a portion which is a part of the flow passage and with which the nozzle is in communication extends is defined as a first direction, a direction in which the liquid is ejected from the nozzle and which is orthogonal to the first direction is defined as a second direction, and a direction which is orthogonal to both the first direction and the second direction is defined as a third direction, given above definition, the nozzle includes a first portion and a second portion, the second portion being located closer to the flow passage along the second direction than the first portion is, cross-sectional area size of the first portion when viewed in the second direction is smaller than cross-sectional area size of the second portion when viewed in the second direction, a width, in the third direction, of an overlapping portion that is a part of the second portion and is included in a first region is greater than a width, in the third direction, of a non-overlapping portion that is a part of the second portion and is included in a second region, the first region is a region where the second portion overlaps with the first portion in the first direction, the second region is a region where the second portion does not overlap with the first portion in the first direction, and a width of the second portion in the second direction is greater than a width of the first portion in the second direction.

20. A liquid ejecting head, comprising:

a flow passage through which a liquid flows;

an energy producing element that produces energy for ejecting the liquid; and a nozzle which is in communication with the flow passage and from which the liquid is ejected by utilizing the energy produced by the energy producing element; wherein a direction in which a portion which is a part of the flow passage and with which the nozzle is in communication extends is defined as a first direction, a direction in which the liquid is ejected from the nozzle and which is orthogonal to the first direction is defined as a second direction, and a direction which is orthogonal to both the first direction and the second direction is defined as a third direction, given above definition, the nozzle includes a first portion and a second portion, the second portion being located closer to the flow passage along the second direction than the first portion is, cross-sectional area size of the first portion when viewed in the second direction is smaller than cross-sectional area size of the second portion when viewed in the second direction, a width, in the third direction, of an overlapping portion that is a part of the second portion and is included in a first region is greater than a width, in the third direction, of a non-overlapping portion that is a part of the second portion and is included in a second region, the first region is a region where the second portion overlaps with the first portion in the first direction, and the second region is a region where the second portion does not overlap with the first portion in the first direction, and a width of the second portion in the second direction is less than a width of the first portion in the second direction.

* * * * *